(12) United States Patent
Agarwal et al.

(10) Patent No.: US 8,680,167 B2
(45) Date of Patent: *Mar. 25, 2014

(54) MOLDING COMPOSITIONS CONTAINING FILLERS AND MODIFIED POLYBUTYLENE TEREPHTHALATE (PBT) RANDOM COPOLYMERS DERIVED FROM POLYETHYLENE TEREPHTHALATE (PET)

(75) Inventors: Parminder Agarwal, Evansville, IN (US); Kristen Cohoon, Evansville, IN (US); Shellie Virginia Gasaway, Los Angeles, CA (US); Ganesh Kannan, Evansville, IN (US); Sung Dug Kim, Newburgh, IN (US); Kenneth Frederick Miller, Posey, IN (US); Dhaval Shah, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 913 days.

This patent is subject to a terminal disclaimer.

(21) Appl. No.: 11/627,091

(22) Filed: Jan. 25, 2007

(65) Prior Publication Data

US 2007/0244242 A1    Oct. 18, 2007

Related U.S. Application Data

(60) Provisional application No. 60/763,083, filed on Jan. 27, 2006, provisional application No. 60/820,469, filed on Jul. 26, 2006.

(51) Int. Cl.
| | |
|---|---|
| *C08J 11/04* | (2006.01) |
| *C08L 67/02* | (2006.01) |
| *C08K 3/04* | (2006.01) |
| *C08K 3/08* | (2006.01) |
| *C08K 3/22* | (2006.01) |
| *C08K 3/34* | (2006.01) |

(52) U.S. Cl.
USPC ............ 521/48; 521/48.5; 524/445; 524/449; 524/481; 524/494; 524/496; 524/604; 977/742

(58) Field of Classification Search
USPC ........... 521/48, 48.5; 524/604, 445, 449, 451, 524/494; 528/280
See application file for complete search history.

(56) References Cited

U.S. PATENT DOCUMENTS

| | | | |
|---|---|---|---|
| 2,465,319 A | 3/1949 | Whinfield et al. | |
| 2,720,502 A | 10/1955 | Caldwell | |
| 2,727,881 A | 12/1955 | Caldwell et al. | |
| 2,822,348 A | 2/1958 | Haslam | |
| 3,047,539 A | 7/1962 | Pengilly | |
| 3,193,523 A | 7/1965 | Neumann et al. | |
| 3,224,043 A | 12/1965 | Lameris et al. | |
| 3,302,243 A | 2/1967 | Ludwig | |
| 3,671,487 A | 6/1972 | Abolins | |
| 3,701,755 A | 10/1972 | Sumoto et al. | |
| 3,864,428 A | 2/1975 | Nakamura et al. | |
| 3,907,868 A | 9/1975 | Currie et al. | |
| 3,907,926 A | 9/1975 | Brown et al. | |
| 3,915,608 A | 10/1975 | Hujik | |
| 3,953,394 A | 4/1976 | Fox et al. | |
| 4,096,156 A | 6/1978 | Freudenberger et al. | |
| 4,128,526 A | 12/1978 | Borman | |
| 4,154,775 A | 5/1979 | Axelrod | |
| 4,264,487 A | 4/1981 | Fromuth et al. | |
| 4,355,155 A | 10/1982 | Nelsen | |
| 4,436,860 A | 3/1984 | Hepp | |
| 4,451,606 A | 5/1984 | Campbell | |
| 4,469,851 A | 9/1984 | Charles et al. | |
| 4,579,884 A | 4/1986 | Liu | |
| 4,598,117 A | 7/1986 | Liu et al. | |
| 4,609,680 A | 9/1986 | Fujita et al. | |
| 4,657,988 A | 4/1987 | Sugerman et al. | |
| 4,670,203 A | 6/1987 | Chang | |
| 4,954,540 A | 9/1990 | Nakane et al. | |
| 5,115,016 A | 5/1992 | Dickens et al. | |
| 5,122,551 A | 6/1992 | Gallucci et al. | |
| 5,221,704 A | 6/1993 | Shimotsuma et al. | |
| 5,232,773 A * | 8/1993 | Itoh et al. .................. | 428/313.5 |
| 5,266,601 A | 11/1993 | Kyber et al. | |

(Continued)

FOREIGN PATENT DOCUMENTS

| | | | |
|---|---|---|---|
| DE | 19904814 A1 | 8/2000 | |
| EP | 0400936 A1 | 12/1990 | |

(Continued)

OTHER PUBLICATIONS

S.H. Mansour et al.,"Depolymerization of Poly(ethylene terephthalate) Waste Using 1, 4-Butanediol and Triethylene Glycol," Journal of Elastomers and Plastics; Apr. 2003, pp. 133-147, vol. 35, Sage Publications.

W. Hale et al., "Compatibilization of PBT/ABS blends by methyl methacrylate-glycidyl methacrylate-ethyl acrylate terpolymers," Polymer 40, 1999, pp. 365-377, Elsevier Science Ltd.

Chemical Processing, [online]; [retrieved on Oct. 14, 2009]; retrieved from the Internet http://www.chemicalprocessing.com/industrynews/2006/056.html Article: "GE gives plastic bottle recycling a new spin," Chemical Processing.com, Aug. 26, 2006, 2pgs.

A. Pawlak et al., "Characterization of scrap poly(ethylene terephthalate)," European Polymer Journal, 2000, pp. 1875-1884, vol. 36, Elsevier Science Ltd.

*Primary Examiner* — Tae H Yoon
(74) *Attorney, Agent, or Firm* — Cantor Colburn LLP; Diderico van Eyl

(57) ABSTRACT

The invention relates to a composition comprising (a) from 5 to 99 wt % of a modified polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component, and (b) at least 1 wt % of a filler component. In one embodiment, the invention relates to an article molded from the above-mentioned molding composition. In another embodiment, the invention relates to methods for making and methods for using the molding composition.

48 Claims, 1 Drawing Sheet

(56) References Cited

U.S. PATENT DOCUMENTS

| | | |
|---|---|---|
| 5,302,645 A | 4/1994 | Nakano et al. |
| 5,326,806 A | 7/1994 | Yokoshima et al. |
| 5,385,970 A | 1/1995 | Gallucci et al. |
| 5,413,681 A | 5/1995 | Tustin et al. |
| 5,439,976 A * | 8/1995 | Kinoshita et al. ............ 525/92 F |
| 5,451,611 A | 9/1995 | Chilukuri et al. |
| 5,559,159 A | 9/1996 | Sublett et al. |
| 5,684,071 A | 11/1997 | Mogami et al. |
| 5,804,654 A | 9/1998 | Lo et al. |
| 5,882,780 A | 3/1999 | Yamamura et al. |
| 5,962,587 A | 10/1999 | Gaggar et al. |
| 6,020,414 A | 2/2000 | Nelsen et al. |
| 6,025,441 A | 2/2000 | Koshirai et al. |
| 6,162,837 A | 12/2000 | Gerking et al. |
| 6,166,114 A | 12/2000 | Cosstick et al. |
| 6,255,371 B1 | 7/2001 | Schlosser et al. |
| 6,384,129 B1 | 5/2002 | Lowry |
| 6,406,081 B1 | 6/2002 | Mahfet et al. |
| 6,410,607 B1 | 6/2002 | Ekart et al. |
| 6,420,459 B1 | 7/2002 | Horold |
| 6,433,045 B1 | 8/2002 | Hanabusa et al. |
| 6,444,283 B1 | 9/2002 | Turner et al. |
| 6,476,158 B1 | 11/2002 | England et al. |
| 6,515,044 B1 | 2/2003 | Idel et al. |
| 6,518,322 B1 | 2/2003 | West |
| 6,531,530 B2 | 3/2003 | Asano |
| 6,569,928 B1 | 5/2003 | Levchik et al. |
| 6,579,943 B1 | 6/2003 | Ishino et al. |
| 6,642,288 B1 | 11/2003 | Hulskotte |
| 6,660,789 B2 | 12/2003 | Uno et al. |
| 6,706,843 B1 | 3/2004 | Ishihara et al. |
| 6,794,463 B2 | 9/2004 | Aramaki et al. |
| 6,887,909 B2 | 5/2005 | Kawamura et al. |
| 6,927,275 B2 | 8/2005 | Hirokane et al. |
| 7,105,589 B2 | 9/2006 | Geprags |
| 7,179,869 B2 | 2/2007 | Hirokane et al. |
| 7,183,362 B2 | 2/2007 | Hirokane et al. |
| 7,388,067 B2 | 6/2008 | Leemans et al. |
| 7,462,649 B2 | 12/2008 | Nakao et al. |
| 7,550,203 B2 | 6/2009 | Ferrari et al. |
| 7,754,055 B2 * | 7/2010 | Harmon et al. .......... 204/157.62 |
| 8,067,493 B2 * | 11/2011 | Zhu et al. ...................... 524/423 |
| 8,138,244 B2 * | 3/2012 | Ding et al. .................... 524/100 |
| 2001/0007888 A1 | 7/2001 | Asano |
| 2002/0012807 A1 | 1/2002 | Kurian et al. |
| 2002/0123566 A1 | 9/2002 | Georgiev et al. |
| 2003/0018107 A1 | 1/2003 | Heinen et al. |
| 2005/0113533 A1 | 5/2005 | Shaikh et al. |
| 2005/0137300 A1 | 6/2005 | Schlosser et al. |
| 2005/0143503 A1 | 6/2005 | Bauer et al. |
| 2005/0154099 A1 | 7/2005 | Kobayashi et al. |
| 2005/0165207 A1 | 7/2005 | Agarwal et al. |
| 2006/0084734 A1 | 4/2006 | Bauer et al. |
| 2007/0203253 A1 | 8/2007 | Agarwal et al. |
| 2007/0244242 A1 | 10/2007 | Agarwal et al. |
| 2007/0275242 A1 | 11/2007 | Gopal et al. |
| 2007/0276069 A1 | 11/2007 | Agarwal et al. |
| 2008/0027167 A1 | 1/2008 | Vollenberg et al. |
| 2008/0139711 A1 | 6/2008 | Borade et al. |
| 2008/0169590 A1 | 7/2008 | Mehta et al. |
| 2009/0124733 A1 | 5/2009 | Haruhara et al. |

FOREIGN PATENT DOCUMENTS

| | | |
|---|---|---|
| EP | 0682080 A1 | 11/1995 |
| EP | 0683201 A1 | 11/1995 |
| GB | 1500577 | 2/1978 |
| JP | 1-174557 A | 7/1989 |
| JP | 4-345655 A | 12/1992 |
| JP | 2000007902 W | 1/2000 |
| JP | 2000-256472 A | 9/2000 |
| JP | 2000-256920 A | 9/2000 |
| JP | 2001-31851 A | 2/2001 |
| JP | 2005-89572 | 7/2005 |
| JP | XP002427996 | 7/2005 |
| JP | 2006-63199 A | 3/2006 |
| JP | 2006176757 | 7/2006 |
| KR | 2001-0083551 A | 9/2001 |
| WO | 99/65987 A1 | 12/1999 |
| WO | 01/21698 A1 | 3/2001 |
| WO | 2005/059018 A1 | 6/2005 |
| WO | WO03/066704 | 1/2007 |
| WO | 20070089653 A1 | 8/2007 |
| WO | 2007111774 A2 | 10/2007 |
| WO | WO9950332 | 10/2007 |

* cited by examiner

- ◆ Virgin PBT
- □ Modified PBT

- ◇ Virgin PBT
- ■ Modified PBT

MOLDING COMPOSITIONS CONTAINING FILLERS AND MODIFIED POLYBUTYLENE TEREPHTHALATE (PBT) RANDOM COPOLYMERS DERIVED FROM POLYETHYLENE TEREPHTHALATE (PET)

CROSS REFERENCE TO RELATED APPLICATION

This application claims the benefits of U.S. Provisional Patent Application Ser. No. 60/763,083 filed Jan. 27, 2006, and U.S. Provisional Patent Application Ser. No. 60/820,469 filed Jul. 26, 2006, which patent applications are fully incorporated herein by reference.

BACKGROUND OF THE INVENTION

The invention relates to the field of molding compositions.

Polyethylene terephthalate (also referred to as "PET") is a polyester of terephthalic acid and ethylene glycol can be obtained by the polycondensation of dimethyl terephthalate with ethylene glycol, and also terephthalic acid with ethylene glycol or ethylene oxide. PET exists both as an amorphous (transparent) and as a semi-crystalline (opaque and white) thermoplastic material. Generally, it has useful chemical resistance to mineral oils, solvents and acids but not to bases. Semi-crystalline PET has good strength, ductility, stiffness and hardness. Amorphous PET has better ductility but less stiffness and hardness. PET is used to make bottles for soft drinks and other household and consumer products. Generally, PET has many uses and several large markets. For this reason, the volume of PET manufactured is large and growing.

Unfortunately, despite recycling efforts, billions of pounds of PET are still dumped into landfills annually all over the world. Other PET that is not reused is incinerated. The PET that is disposed into landfills creates significant waste. The incineration of PET wastes a significant resource that could be used more effectively.

Thermoplastic molding compositions based on polybutylene terephthalate (also referred to as "PBT"), polycarbonates, and impact modifiers are used in various applications. Although useful to many customers, conventional PBT-polycarbonate-impact modifier molding compositions generally cannot be made from recycle sources of PBT due to the lack of availability of large post-consumer or post-industrial PBT. PET, unlike PBT, is made in much larger quantities and is more easily recovered from consumer wastes. If PET (scrap) materials could be converted to PBT and converted into useful molding compositions, then there would exist a valuable way to meet the unmet need to effectively use underutilized scrap PET in PBT thermoplastic molding compositions. If PET (scrap) materials could be converted to PBT and converted into useful molding compositions, then there would be an effective use of post consumer or post-industrial streams. PBT made this way would conserve our non-renewable resources and reduce the formation of greenhouse gases, e.g., $CO_2$.

U.S. Pat. No. 5,451,611 teaches a process for converting waste polyethylene terephthalate to either poly(ethylene-co-butylene terephthalate) or poly butylene terephthalate (PBT) by reaction with 1,4-butanediol. In discussing the prior art, U.S. Pat. No. 5,451,611 indicates that in most of the processes it cites, the undesirable byproduct diethylene glycol is formed, which contaminates the final product and has to be removed by purification before the recovered products can be reused again. A principal object of U.S. Pat. No. 5,451,611 was to provide a process for converting polyethylene terephthalate waste directly to another high value polymer without breaking down the polyethylene terephthalate to its constituent monomers or oligomers. The patent discloses numerous examples in which a variety of polymers have a diol incorporated at various amounts. Example 11 shows a PBT polymer being formed with a complete replacement of ethylene glycol with 1,4-butanediol.

U.S. Pat. No. 5,266,601 teaches a process for making "PBT" from PET by reacting PET with 1,4-butanediol. A principal object of U.S. Pat. No. 5,266,601 was to produce PBT containing less than 1.0 wt. % units of ethylene glycol from PET scrap. Another principal objective of U.S. Pat. No. 5,266,601 was to develop a process that facilitates the reduction of THF generated in the process as much as possible to the extent that this PBT is economically competitive with PBT obtained from monomers. U.S. Pat. No. 5,266,601 emphasizes the production of PBT having ethylene glycol groups in an amount that is less than 1 wt. %. In the instances where compositions contain more than 1 wt. %, U.S. Pat. No. 5,266,601 presents these compositions in comparative examples. Such compositions are described as having "yellowish" and "slightly yellowish" colors, respectively.

Japanese laid-open application 2005-89572 teaches a method for producing polybutylene terephthalate by transesterifying bis (2-hydroxyethyl) terephthalate with 1,4-butanediol in the presence of a transesterification reaction catalyst under the pressure of 1-54 kPa at a final temperature ranging from 200-230° C. and then subjecting the reaction product to polycondensation. In one embodiment, the bis(2-hydroxyethyl) terephthalate is obtained by depolymerizing polyethylene terephthalate with excessive ethylene glycol, and purifying the depolymerized product. The patent teaches that transesterifying bis (2-hydroxyethyl) terephthalate with 1,4-butanediol under reduced pressure imparts favorable results.

Unfortunately, such documents do not meet the long felt need of improved use of PET scrap that is ordinarily incinerated or buried in landfills. U.S. Pat. No. 5,451,611, for instance, does not teach effective processes that enable PET to be able to be broken down into its constituent monomers or oligomers-a feature that is sometimes required by commercial considerations. U.S. Pat. No. 5,451,611 does not provide meaningful guidelines for making compositions functionally similar to PBT containing ethylene glycol in amounts other than trace amounts and which exhibit melting temperatures that are higher than those shown in its examples. Similarly, U.S. Pat. No. 5,266,601 does not provide meaningful details about how to make molding compositions containing polycarbonates, other materials such as flame retardants, epoxies, and PBT with a PET residue such as ethylene glycol in any amount, let alone an amount that is more than 1 wt. %. In fact, neither patent discusses if or how the materials they describe can be used in molding compositions containing polycarbonates, impact modifiers and other materials. Japanese laid-open application 2005-89572 is also silent about molding compositions containing polycarbonates, impact modifiers and PBT as well as methods for utilizing PET effectively to make such compositions. Known technology relating to utilizing PET as scrap materials for making PBT-like materials, in other words, does not provide meaningful solutions that solve the long felt need of new processes for better utilizing PET scrap that is ordinarily incinerated or buried in landfills. Known technology does not provide meaningful solutions that solve the long felt need of new thermoplastic compositions containing fillers and PBT derived from PET and a combination of physical properties that are highly useful and valued by customers.

For the foregoing reasons, there is a need to develop new molding compositions containing fillers that utilize PBT derived from PET and that have useful performance properties.

For the foregoing reasons, there is a need to develop new molding compositions that reduce the amount of $CO_2$ emissions.

For the foregoing reasons, there is a need to develop new processes for making molding compositions that utilize PBT derived from PET and that have useful performance properties.

SUMMARY OF THE INVENTION

The invention relates to a composition comprising:
(a) from 5 to 99 wt. % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and
(a) at least 1 wt. % of a filler component;
wherein the modified polybutylene terephthalate, the filler component, and optionally at least one additive, are present in a total combined amount of 100 wt. %.

In another embodiment, the invention relates to a molding composition comprising:
(a) from 30 to 90 wt. % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, cyclohexanedicyclohexane dicyclo hexanedicyclohexane dialkaline earth metal salts, alkali salts, phosphorous-containing compounds and anions, sulfur-containing compounds and anions, napthalene dicarboxylic acids, 1,3-propanediol groups, and combinations thereof.
(b) a filler component in an amount that is at least 5 wt. %;
(c) flame retardant components in an amount that is at least 5 wt. %;
(d) a carboxy reactive component in an amount that is at least 0.1 wt. %;
(e) a heat stabilizer in an amount that is at least 0.05 wt. %, and
(f) a UV stabilizer in an amount that is at least 0.05 wt. %;
wherein the combined amount of (a), (b), (c), (d), (e), (f) and optionally any additional additives, is 100 wt %.

In another embodiment, the invention relates to a composition comprising:
(a) from 35 to 50 wt. % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and
(b) from 25 and 45 wt. % of a filler component;
(b) from 10 and 30 wt. % of polycarbonate
(c) from 0 and 10 wt. % of an impact modifier;
(d) from 0 to 5 wt. % of an additive;
wherein the modified polybutylene terephthalate, the filler component, the polycarbonate, the impact modifier, and the additive are present in a total combined amount of 100 wt. %.

In another embodiment, the invention relates to an article molded or extruded from the above-mentioned molding compositions.

In another embodiment, the invention relate to a molding composition comprising:
(a) from 30 to 90 wt. % of a modified polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, cyclohexanedicyclohexane dicyclohexanedicyclohexanedialkaline earth metal salts, alkali salts, phosphorous-containing compounds and anions, sulfur-containing compounds and anions, napthalene dicarboxylic acids, 1,3-propanediol groups, and combinations thereof.
(b) a filler component in an amount that is at least 5 wt. %;
(c) a flame retardant component in an amount that is at least 5 wt. %;
(d) a carboxy reactive component in an amount that is at least 0.1 wt. %;
(e) a heat stabilizer in an amount that is at least 0.05 wt. %, and
(f) a UV stabilizer in an amount that is at least 0.05 wt %;
wherein the combined amount of (a), (b), (c), (d), (e), (f) and optionally any additional additives, is 100 wt. %;
wherein the composition has a total monomer content selected from the group consisting of ethylene glycol, isophthalic acid groups, and diethylene glycol groups in an amount ranging from more than 0 and less than or equal to 17 equivalents of a residue selected from the group of isophthalic acid groups, ethylene glycol groups, and diethylene glycol groups, and combinations thereof, relative to the total of 100 equivalents of diol and 100 equivalents of diacid groups in the modified polybutylene terephthalate random copolymer;
wherein the composition has a heat deflection temperature that is at least 180° C., as determined by ASTM D648 at 0.455 MPa; and
wherein the composition has a melt volume rate is from 10% to 80% higher, as compared to a composition made with monomer derived polybutylene terephthalate homopolymers instead of the modified polybutylene terephthalate random copolymers, as measured on pellets according to ISO 1133 method at 250° C. and 5 kgf at dwelling time of 240 seconds and a 2.1 mm orifice.

In another embodiment, the invention relates to methods for making and methods for using the molding composition. These and other features, aspects, and advantages of the present invention will become better understood with reference to the following description and appended claims.

DESCRIPTION OF THE FIGURES

These and other features, aspects, and advantages of the present invention will become better understood with reference to the following description and appended claims, where:

DETAILED DESCRIPTION OF THE INVENTION

Figure 1:
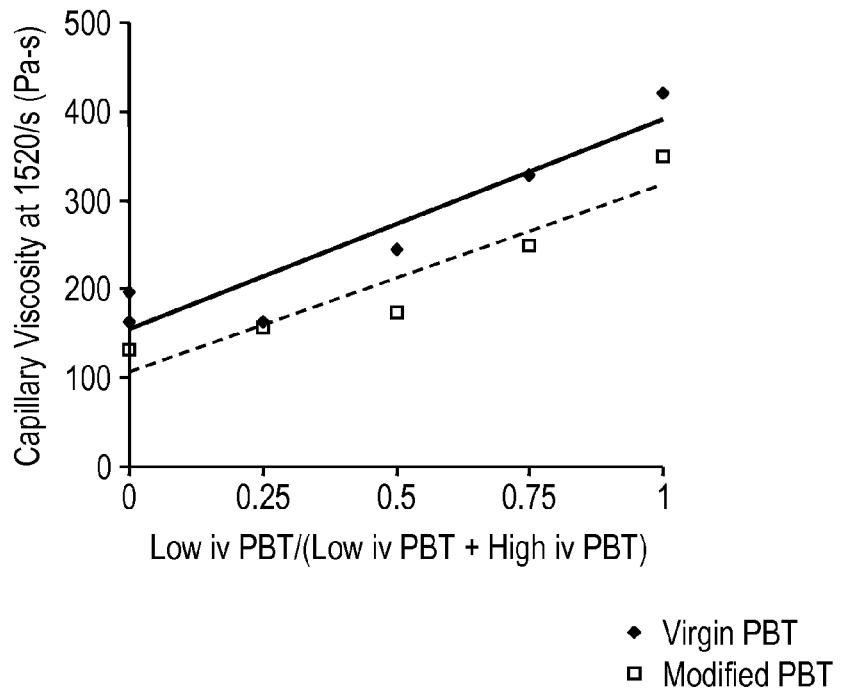
FIG. 1 shows the capillary viscosity at versus ratio properties for compositions containing modified PBT residues containing PET residues and molding compositions containing monomer-based PBT.

The invention is based on the remarkable discovery that it is now possible to make molding compositions, which have useful physical properties, suitable in commercial applications, which contains a modified-PBT random copolymer derived from polyethylene terephthalate, e.g., used PET soft drink bottles. Unlike conventional molding compositions containing virgin PBT (PBT that is derived from monomers), the modified-PBT component used in the articles contains a polyethylene terephthalate residue, e.g., materials such as ethylene glycol and isophthalic acid groups (components that are not present in "virgin," monomer-based PBT). Advantageously, despite using a PBT that is structurally different from virgin PBT, our articles exhibit similar performance properties as articles made from molding compositions containing monomer-based PBT. The invention can provide a valuable way to meet the unmet need to effectively use underutilized scrap PET in PBT thermoplastic molding compositions. The invention can provide an effective use of post consumer or post-industrial streams. Further, the invention can conserve our non-renewable resources and reduce the formation of greenhouse gases, e.g., $CO_2$. Surprisingly, molding compositions containing modified-Polybutylene terephthalate random copolymers derived from polyethylene terephthalate can exhibit improved flow properties, as compared to molding compositions containing PBT derived from monomers.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

All molecular weights in this application refer to number average molecular weight obtained with the polystyrene standard. Details of the technique include the following items: (i) Instrument: Waters 2695 separation module; (ii) Detector: Waters 2487 Dual Absorbance Ultraviolet Detector @273 and 295 nanometers and Water 410 refractomer; (iii) Mobile phase: 5% HFIP 95% chloroform; (iv) GPC columns: Polymer Labs PL HFIPgel 250×4.6 mm, (v) Flow rate: 0.3 ml/min; (vi) Injection volume 10 µl; (vii) Polystyrene standards: Polymer Lab's Easical PS-1, 580-7,500,000 Da.

All ASTM tests and data are from the 2003 edition of the Annual Book of ASTM Standards unless otherwise indicated.

For the sake of clarity, the terms terephthalic acid group, isophthalic acid group, butanediol group, ethylene glycol group in formulas have the following meanings. The term "terephthalic acid group" (R') in a composition refers to a divalent 1,4-benzene radical (-1,4-$(C_6H_4)$—) remaining after removal of the carboxylic groups from terephthalic acid-. The term "isophthalic acid group" (R") refers to a divalent 1,3-benzene radical (-(-1,3-$C_6H_4$)—) remaining after removal of the carboxylic groups from isophthalic acid. The "butanediol group" (D) refers to a divalent butylene radical (—$(C_4H_8)$—) remaining after removal of hydroxyl groups from butanediol. The term "ethylene glycol group" (D') refers to a divalent ethylene radical (—$(C_2H_4)$—) remaining after removal of hydroxyl groups from ethylene glycol.-). With respect to the terms "isophthalic acid group," "ethylene glycol group," and "diethylene glycol group" being used in other contexts, e.g., to indicate the weight % of the group in a composition, the term "isophthalic acid group(s)" means the group having the formula (—$O(CO)C_6H_4(CO)$—), the term "terephthalic acid group(s)" means the group having the formula (—$O(CO)C_6H_4(CO)$—), the term diethylene glycol group means the group having (—$O(C_2H_4)O(C_2H_4)$—), the term "butanediol group(s)" means the group having the formula (—$O(C_4H_8)$—), and the term "ethylene glycol groups(s)" means the group having formula (—$O(C_2H_4)$—).

The term "random copolymer," as used in this application refers to a copolymer that includes macromolecules in which the probability of finding a given monomeric unit at any given site in the chain is independent of the nature of the adjacent units.

An embodiment of the invention relates to a composition comprising:

(a) from 5 to 99 wt. % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and (b) at least 1 wt. % of a filler component.

The modified polybutylene terephthalate component derived from polyethylene terephthalate (PET-derived modified PBT component) is (1) is derived from polyethylene terephthalate component selected from the group consisting of polyethylene terephthalate and polyethylene terephthalate copolymers and (2) has at least one residue derived from the polyethylene terephthalate component. In one embodiment, the modified polybutylene terephthalate component can further be derived from a biomass-derived 1,4-butanediol, e.g. corn derived 1,4-butanediol or a 1,4-butane-diol derived from a cellulosic material.

The residue derived from the polyethylene terephthalate component, which is present in the modified polybutylene terephthalate component can be selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexanedimethanol isomers, 1,4-cyclohexanedimethanol isomers, the cis isomer of 1,3-cyclohexanedimethanol, the cis isomer of 1,4-cyclohexanedimethanol, the 1,3-trans isomer of cyclohexanedimethanol, the 1,4-trans isomer of 1,4-cyclohexanedimethanol, alkali salts, alkaline earth metal salts, e.g., calcium, magnesium, sodium and potassium salts, phosphorous-containing compounds and anions, sulfur-containing compounds and anions, naphthalene dicarboxylic acids, 1,3-propanediol groups, and combinations thereof.

Depending on factors such as polyethylene terephthalate and polyethylene terephthalate copolymers, the residue can include various combinations. In one embodiment, for instance, the residue includes mixtures of ethylene glycol and diethylene glycol. In another embodiment, the residue includes mixtures of ethylene glycol and diethylene glycol and isophthalic acid. In another embodiment, the residue derived from polyethylene terephthalate further includes cis isomer of 1,3-cyclohexanedimethanol, 1,4-cyclohexanedimethanol, trans isomer of 1,3 cyclohexanedimethanol, trans isomer of 1,4 cyclohexanedimethanol and combinations thereof. In another embodiment, the residue includes cis isomer of 1,3-cyclohexanedimethanol, 1,4-cyclohexanedimethanol, trans isomer of 1,3 cyclohexanedimethanol, trans isomer of 1,4 cyclohexanedimethanol and combinations thereof. And in another embodiment, the residue can be a mixture of ethylene glycol, diethylene glycol, isophthalic acid groups, cis isomer of cyclohexanedimethanol, trans isomer of cyclohexanedimethanol, and combinations thereof. In one embodiment, the residue derived from polyethylene terephthalate includes mixtures of ethylene glycol, diethylene glycol, and cobalt-containing compounds. Such cobalt-containing compound mixture can also contain isophthalic acid groups.

The amount of the ethylene glycol groups, diethylene glycol groups, and the isophthalic groups in the polymeric backbone of the modified PBT component can vary. The PET-derived modified PBT component ordinarily contains isophthalic acid groups in an amount that is at least 0.1 mole % and can range from 0 or 0.1 to 10 mole % (0 or 0.07 to 7 wt. %). The PET-derived modified PBT component ordinarily contains ethylene glycol in an amount that is at least 0.1 mole % and can range from 0.1 to 10 mole % (0.02 to 2 wt. %). In one embodiment, the PET-derived modified PBT component has an ethylene glycol content that is more than 0.85 wt. %. The modified PBT component can also contain diethylene glycol in an amount ranging from 0.1 to 10 mole % (0.04 to 4 wt. %). The amount of the butanediol groups is generally about 98 mole % and can vary from 95 to 99.8 mole % in some embodiments. The amount of the terephthalic acid groups is generally about 98 mole % and can vary from 90 to 99.9 mole % in some embodiments.

Unless otherwise specified, all molar amounts of the isophthalic acid groups and or terephthalic acid groups are based on the total moles of diacids/diesters in the composition. Unless otherwise specified, all molar amounts of the butanediol, ethylene glycol, and diethylene glycol groups are based on the total moles of diol in the composition. The weight percent measurements stated above are based on the way terephthalic acid groups, isophthalic acid groups, ethylene glycol groups, and diethylene glycol groups have been defined herein.

The total amount of materials of the polyethylene terephthalate component residue in the modified polybutylene random copolymer can vary. For instance, mixtures can be in an amount ranging from 1.8 to 2.5 wt. %, or from 0.5 to 2 wt. %, or from 1 to 4 wt. %. The ethylene glycol, diethylene glycol, and cyclohexanedimethanol groups can be individually or in combination present in an amount ranging from 0.1 to 10 mole %, based on 100 mole % of glycol the molding composition. The isophthalic acid groups can be present in an amount ranging from 0.1 to 10 mole %, based on 100 mole % of diacid/diester in the molding composition.

It has been discovered that when it is desirable to make a polybutylene terephthalate copolymers having a melting temperature Tm that is at least 200° C., the total amount of diethylene glycol, ethylene glycol, and isophthalic acid groups should be within a certain range. As such, in one embodiment, the total amount of the diethylene glycol, ethylene glycol, and isophthalic acid groups in the modified polybutylene terephthalate component is more than 0 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 3 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 3 and less than or equal to 10 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 10 and less than or equal to 23 equivalents, relative to the total of 100 equivalents of diol and 100 equivalents of diacid groups in the modified polybutylene terephthalate random copolymer. In one embodiment, diethylene glycol, ethylene glycol and/or isophthalic acid can be added during the process, thereby enabling the user with a system for making compositions having different properties.

The total ethylene glycol groups, isophthalic acid groups, and diethylene glycol groups can vary, depending on the application and the user's needs. In one embodiment, the composition can have total monomer content selected from the group consisting of ethylene glycol, isophthalic acid groups, and diethylene glycol groups in an amount ranging from more than 0 and less than or equal to 17 equivalents relative to the total of 100 equivalents of diol and 100 equivalents of diacid groups in the modified polybutylene terephthalate random copolymer. Advantageously, such compositions can maintain useful properties, such as heat deflection temperatures that are more than 180° C.

It has also been discovered that the total amount of inorganic residues derived from the polyethylene terephthalate can be present from more than 0 ppm and up to 1000 ppm. Examples of such inorganic residues can be selected from the group consisting of antimony-containing compounds, germanium-containing compounds, titanium-containing compounds, cobalt-containing compounds, tin containing compounds, aluminum, aluminum salts, alkaline earth metal salts, alkali salts, including calcium, magnesium, sodium and potassium salts, phosphorous-containing compounds and anions, sulfur-containing compounds and anions, and combinations thereof. In another embodiment, the amounts of inorganic residues can range from 250 to 1000 ppm. In another embodiment, the amounts of inorganic residues can range from 500 to 1000 ppm.

The PET component from which the modified polybutylene terephthalate random copolymer is made can be in any form that can be used according to our invention. Generally, the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid and other contaminants. Also, the PET component can include PET that is not waste in flake, chip or pellet form. As such, PET that would ordinarily be deposited in landfills can now be used productively and effectively. In one embodiment, PET component can also include other polyesters. The PET component can also include polyester copolymers. Examples of such materials include polyalkylene terephthalates that can be selected from polyethylene terephthalate, polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polybutylene terephthalate, poly-xylylene terephthalate, polydianol terephthalates, polybutylene terephthalate, polytrimethylene terephthalate, polyester naphthalates, and combinations thereof.

A modified polybutylene terephthalate random copolymer derived from the polyethylene terephthalate component can be derived from a polyethylene terephthalate component by any method that involves depolymerization of a polyethylene terephthalate component and polymerization of the depolymerized polyethylene terephthalate component with 1,4-butanediol into the modified polybutylene terephthalate random copolymer. For instance, the modified polybutylene terephthalate component derived from the polyethylene terephthalate component can be made by a process that involves depolymerizing a polyethylene terephthalate component selected from the group consisting of polyethylene terephthalate and polyethylene terephthalate copolymers with a 1,4-butanediol component at a temperature ranging from 180° C. to 230° C., under agitation, at a pressure that is at least atmospheric pressure in the presence of a catalyst component, at an elevated temperature, under an inert atmosphere, to produce a molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof; and agitating the molten mixture at subatmospheric pressure and increasing the temperature of the molten mixture to an elevated temperature under conditions sufficient to form a modified random polybutylene terephthalate copolymer containing at least one residue derived from the polyethylene terephthalate component.

Polyester moieties and the 1,4-butanediol are combined in the liquid phase under agitation and the 1,4-butanediol can be continuously refluxed back into the reactor during step (a). The THF and water formed in the stage can be removed by distillation or partial condensation.

The polyethylene terephthalate component and the 1,4-butanediol component are generally combined under atmospheric pressure. In another embodiment of the invention, however, it is possible to use pressures that are higher than atmospheric pressures. For instance, in one embodiment, the pressure at which the polyethylene terephthalate component and the 1,4-butanediol are subjected to is 2 atmospheres, or higher. For higher pressures, the reaction mixtures can be depolymerized at temperatures higher than 230° C.

The temperature at which the polyethylene terephthalate component and the 1,4-butanediol component are combined and reacted is sufficient to promote depolymerization of the polyethylene terephthalate component into a mixture of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof. The temperature at which the polyethylene terephthalate component and the 1,4-butanediol component are combined generally ranges from 180° C. to 230° C. 1,4-butanediol is generally used in excess amount relative to the polyethylene terephthalate component. In one embodiment, 1,4-butanediol is used in a molar excess amount ranging from 2 to 20.

During the initial stage of the process when the polyethylene terephthalate component and the 1,4-butanediol are combined and react ("step (a)"), the polyethylene terephthalate component and the 1,4-butanediol depolymerize into a molten mixture at a pressure that is at least atmospheric pressure suitable conditions. 1,4-butanediol, ethylene glycol, are generally recirculated, and tetrahydrofuran is distilled during "step (a)" of the process. The molten mixture contains oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof.

The duration of the step in which polyethylene terephthalate component reacts with 1,4-butanediol can vary, depending on factors, such as available equipment, production needs, desired final properties, and the like. In one embodiment, this step is carried out in at least 2 hours. In another embodiment, the step is carried out from 2 to 5 hours.

The process further includes the step of subjecting the molten mixture to subatmospheric pressure and increasing the temperature of the molten mixture to a temperature ranging from 240° C. to 260° C., and thereby forming the modified polybutylene terephthalate component derived from the polyethylene terephthalate component.

Excess butanediol, ethylene glycol, and tetrahydrofuran (THF) are preferably removed and step (b) is carried out under agitation. The molten mixture, when placed in subatmospheric pressure conditions at a suitable temperature for a sufficiently long time period, polymerizes into a modified polybutylene terephthalate component derived from the polyethylene terephthalate component random copolymer.

Generally, the molten mixture pressure is subjected to a pressure ranging from subatmospheric to less than 1 Torr. In one embodiment, the pressure is reduced to a pressure ranging from 100 to 0.05 Torr in a continuous manner. In another embodiment, the pressure is reduced to a pressure ranging from 10 to 0.1 Torr in a continuous fashion.

Advantageously, the molten mixture can be placed under subatmospheric conditions without isolation and dissolution of any material from the molten mixture. The avoidance of this step greatly enhances the utility of the process.

During the step when the molten mixture is placed under subatmospheric conditions and the temperature is increased, excess butanediol, ethylene glycol and THF are removed from the reactor and oligomers are allowed to build in molecular weight. Agitation can be continuously provided to facilitate the removal of the low boiling components and allow the molecular weight buildup of the polymer. After sufficient molecular weight is obtained, the resulting molten PBT polymer is cast from the reactor through a diehead, cooled with water, stranded and chopped into pellets.

The duration of the step (step (b) discussed above) in which the molten mixture polymerizes from polyethylene terephthalate and poly(butylene terephthlate) oligomers, 1,4, butanediol, and ethylene glycol can vary, depending on factors, such as equipment available, production needs, desired final properties, and the like. In one embodiment, this step is carried out in at least two hours. In another embodiment, the step is carried out from 2 to 5 hours.

The temperature at which the molten mixture is placed under subatmospheric conditions is sufficiently high to promote polymerization of the polyethylene terephthalate and poly(butylene terephthlate) oligomers, 1,4-butanediol, and ethylene glycol to the modified polybutylene terephthalate component derived from the polyethylene terephthalate component. Generally, the temperature is at least 230° C. In one embodiment, the temperature ranges from 250° C. to 275° C.

Both steps of the process can be carried out in the same reactor. In one embodiment, however, the process is carried out in two separate reactors, where step (a) is carried out in a first reactor and when the molten mixture has formed, the molten mixture is placed in a second reactor and step (b) is carried out. In another embodiment, the process can be carried out in more than two reactors. In another embodiment, the process can be carried out in a continuous series of reactors.

The catalyst component that is used to facilitate the reaction of the process generally includes a catalyst that facilitates the reaction. The catalyst can be selected from antimony compounds, tin compounds, titanium compounds, combinations thereof as well as many other metal catalysts and combinations of metal catalysts that have been disclosed in the literature. The amount of the catalyst will vary on the specific need at hand. Suitable amounts of the catalyst range from 1 to 5000 ppm, or more.

The catalyst component is generally added during the step when the polyethylene terephthalate component initially combines with the 1,4-butanediol. In another embodiment, however, the catalyst component may be added to the molten mixture that forms after the polyethylene terephthalate component and the 1,4-butanediol component are combined.

The process for making the modified polybutylene terephthalate component derived from the polyethylene terephthalate component is preferably carried out under agitative conditions. The term "agitative conditions" or "agitation" refers to subjecting the polyethylene terephthalate component and the 1,4-butanediol or the molten mixture to conditions that involve physically mixing the polyethylene terephthalate component 1,4-butanediol or molten mixture under conditions that promote the depolymerization of the PET when the agitative conditions are applied to polyethylene terephthalate component 1,4-butanediol "step (a)", or the polymerization of the PBT from polyethylene terephthalate oligomers, 1,4-butanediol, and ethylene glycol "step (b)." The physical mixing can be accomplished by any suitable way. In one embodiment, a mixer containing rotating shaft and blades that are perpendicular to the shaft can be used.

The process for making the modified polybutylene terephthalate component derived from the polyethylene terephthalate component can include a step that reduces the amount of THF produced during the process by adding a basic compound containing an alkali metal to the reactor in step (a) and thereby reducing formation of THF.

The basic compound contains an alkali metal and can be selected from one or more of the following compounds sodium alkoxides, sodium hydroxide, sodium acetate, sodium carbonate, sodium bicarbonates, potassium alkoxides, potassium hydroxide, potassium acetate, potassium carbonate, potassium bicarbonate, lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminium alkoxides, aluminium hydroxide, aluminium acetate, aluminium carbonate, aluminium bicarbonates, and combinations thereof.

The amount of the basic compound added to a mixture is generally at least 0.1 ppm. In one embodiment, the amount of the basic compound is from 0.1 to 50 ppm. In another embodiment, the amount of the basic compound ranges from 1 to 10 ppm.

The addition of the basic compound containing an alkali metal can reduce the amount of total THF production, as compared to when the process is carried out without the basic compound. In one embodiment, the total THF produced during the process is reduced by at least 10%, as compared to a process that does not use the basic compound. In another embodiment, the total THF produced during the process is reduced ranges from at least 10% to 50%, or more.

In another embodiment, a difunctional epoxy compound can be added to reduce the formation of THF. The epoxy compounds may be selected from the group of difunctional epoxies. Examples of suitable difunctional epoxy compounds include and are not limited to difunctional epoxy compounds include, but are not limited to, 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl) adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate. The amount of the epoxy that may be added to the mixture is generally at least 0.05 wt. %. In one embodiment, the amount of the epoxy compound is from 0.1 to 1 wt. %. In another embodiment, the amount of the epoxy compound was 0.2 to 0.5 wt. %. In one embodiment, the invention provides an additional embodiment in which THF production is reduced by a process that involves the steps of:

(a) reacting (i) a polyethylene terephthalate component selected from the group consisting of polyethylene terephthalate and polyethylene terephthalate copolymers with a diol component selected from the group consisting of ethylene glycol, propylene glycol, and combinations thereof, in a reactor at a pressure that is at least atmospheric pressure in the presence of a catalyst component at a temperature ranging from 190° C. to 250° C., under an inert atmosphere, under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof; wherein the polyethylene terephthalate component and the diol component are combined under agitation;

(b) adding 1,4-butanediol to the first molten mixture in a reactor in the presence of a catalyst component at a temperature ranging from 190° C. to 240° C., under conditions that are sufficient to form a second molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof; and (c) increasing the temperature of the second molten mixture under subatmospheric conditions and agitation to a temperature from 240° C. to 260° C., thereby forming a modified random polybutylene terephthalate copolymer containing at least one residue derived from the polyethylene terephthalate component.

This three step embodiment provides an additional advantageous way for producing modified Polybutylene terephthalate random copolymers from PET. The diol component used in step (a) f of the three step embodiment can be selected from ethylene glycol, propylene glycol, and combinations thereof. The diol component can be present in step (a) at a molar amount that is at least half the amount of ethylene glycol moieties present in the polyethylene terephthalate component. The depolymerization of the polyethylene terephthalate component can be carried out for various times. In one embodiment, the depolymerization is carried out for at least 25 minutes.

The 1,4-butanediol used during step (b) of the three step embodiment can be added at a molar amount that is in excess relative to the molar amount of butanediol moieties incorporated into the modified polybutylene terephthalate random copolymer component obtained in step (c).

During the process the compounds used in the process can be reused and/or collected. In one embodiment, the diol component selected from the group consisting of ethylene glycol, propylene glycol, and combinations thereof and (2) 1,4-butanediol are removed and collected in a vessel in step (b). In another embodiment, in step (b), 1,4-butanediol is refluxed back into the reactor and a component selected from the group of excess butanediol, ethylene glycol, propylene glycol, tetrahydrofuran, and combinations thereof is removed. Step (b) is practiced for a sufficient period of time to reduce at least 65% of ethylene glycol from the second molten mixture. The duration of step (b) can also vary. In one embodiment, step (b) lasts at least 45 minutes. The pressure at which step (b) is carried out can vary. In one embodiment, step (b) is carried out in atmospheric conditions. In another embodiment, step (b) is carried out in subatmospheric conditions. Different combinations are possible. In one embodiment, step (b) is carried out with excess 1,4-butanediol and at a pressure ranging from 300 to 1500 mbar absolute. In another embodiment, 1,4-butanediol is used in a molar excess amount ranging from 1.1 to 5.

Step (c) of the three step embodiment can also be carried out with modifications, depending on the application. In one embodiment, for instance, a component selected from the group of excess butanediol, ethylene glycol, propylene glycol, tetrahydrofuran, and combinations thereof is removed during step (c). The pressure at which step (c) is carried out can also vary. In one embodiment, step (c) is carried out at a pressure that is less than 10 mbar. The three step process can be carried out in the same reactor. Alternatively, the three step process can be carried out in at least two reactors.

In another embodiment, the three step process can include the step of adding a basic compound during step (a), step (b), step (c), and combinations thereof, and thereby further reduce THF production. The basic compound, as in the two step embodiment, can contain those compounds mentioned above. Alternatively, difunctional epoxy compounds can be added during step (b) in the amounts indicated above.

Advantageously the three step process can reduce tetrahydrofuran by an amount that is at least 30% as compared to the amount of tetrahydrofuran produced by a process that depolymerizes polyethylene terephthalate component with 1,4-butanediol instead of the diol component selected from the group consisting of ethylene glycol, propylene glycol, and combinations thereof.

The process for making the modified polybutylene terephthalate component derived from the polyethylene terephthalate component may contain an additional step in which the PBT formed from the molten mixture is subjected to solid-state polymerization. Solid-state polymerization generally involves subjecting the PBT formed from the molten mixture to an inert atmosphere or subatmospheric pressure and heating to a temperature for a sufficient period of time to build the molecular weight of the PBT. Generally, the temperature to which the PBT is heated is below the melting point of the PBT, e.g., from 5° C. to 60° C. below the melting point of the PBT. In one embodiment, such a temperature may range from 150° C. to 210° C. Suitable periods of time during which the solid-state polymerization occurs may range from 2 to 20 hours, depending on the conditions and equipment. The solid-state polymerization is generally carried out under tumultuous conditions sufficient to promote further polymerization of the PBT to a suitable molecular weight. Such tumultuous conditions may be created by subjecting the PBT to tumbling, the pumping of inert gas into the system to promote fluidization of polymer particle, e.g., pellets, chips, flakes, powder, and the like. The solid-state polymerization can be carried out at atmospheric pressure and/or under reduced pressure, e.g. from 1 atmosphere to 1 mbar Our invention includes an embodiment in which the 1,4-butanediol can be derived from biomass. The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols; diacids; monomers used to make diols or acids, e.g., succinic acid; monomers used to make polymers; and the like. Biomass based butanediol can be obtained from several sources. For instance, the following process can be used to obtain biomass-based 1,4-butanediol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™". This succinic acid can be easily converted into 1,4-butanediol by processes described in several published documents such as in U.S. Pat. No. 4,096,156, incorporated herein in its entirety. Biomass derived-1,4-butanediol can also be converted to tetrahydrofuran, and further converted to polytetrahydrofuran, also known as polybutylene oxide glycol. Another process that describes converting succinic acid into 1,4-butanediol is described in Life Cycles Engineering Guidelines, by Smith et al., as described in EPA publication EPA/600/R-1/101 (2001).

The amount of the PET-derived modified PBT component in a molding composition varies with the specific application. Generally, the amount of the PET-derived modified PBT component in a molding composition of the invention ranges from to 5 to 90 wt. %. In another embodiment, the amount of the PET-derived modified PBT component in a composition ranges from 5 to 99 wt. %. In another embodiment, the amount of the PET-derived modified PBT component is present ranges from 10 to 50 wt.

The filler component of the molding compositions generally includes inorganic fillers to the thermoplastic resin provide higher tensile modulus, density and low coefficient of thermal expansion without deleteriously affecting the other favorable properties. Examples of suitable inorganic fillers include: alumina, amorphous silica, anhydrous alumino silicates, mica, wollastonite, barium sulfate, zinc sulfide, clays, talc, metal oxides such as titanium dioxide. Low levels (0.1-10.0 wt. %) of very small particle size (largest particles less than 10 microns in diameter) are useful in one embodiment. In one embodiment, the filler are present in an amount that is at least 1 wt. %, and the fillers are selected from the group consisting of glass fillers, ceramic fillers, carbon fillers, nano-fillers, nano-tubes, nano-composites, and combinations thereof.

A particularly suitable embodiment of fillers includes reinforcing fibers such as glass, ceramic and carbon and are generally well known in the art, as are their methods of manufacture. In one embodiment, glass is particularly suitable, especially glass that is relatively soda free. Fibrous glass filaments comprised of lime-alumino-borosilicate glass, which is also known as "E" glass are often especially suitable. Glass fiber is added to the composition to increase the flexural modulus and strength. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns are required with a diameter of from 10-15 microns being preferred. In preparing the molding compositions it is convenient to use the fiber in the form of chopped strands of from about ⅛" (3 mm) to about ½" (13 mm) long although roving may also be used. In articles molded from the compositions, the fiber length is typically shorter presumably due to fiber fragmentation during compounding of the composition. The length of such short glass fibers present in final molded compositions is less than about 4 mm. The fibers may be treated with a variety of coupling agents to improve adhesion to the resin matrix. Preferred coupling agents include; amino, epoxy, amide or mercapto functionalized silanes. Organo metallic coupling agents, for example, titanium or zirconium based organo metallic compounds, may also be used.

Other preferred sizing-coated glass fibers are commercially available from Owens Corning Fiberglass as, for example, OCF K filament glass fiber 183F.

In another embodiment, long glass fibers can be used, wherein a continuous glass fiber bundle containing glass fiber monofilaments having a diameter in the range, 10-24 µm, preferably 13-18 µm is impregnated with a melted thermoplastic preferably a polyester. After cooling, the impregnated bundle is cut into pellets having a length of >5 mm, preferably, above >9 mm. For impregnation, a high flow polyester of the present invention can be used in order to improve the wetting rate of the filaments to make long glass fiber pellets. These pellets can be incorporated into the polyester compositions of the invention, to get long fiber glass reinforced polyester compositions. The length of long glass fiber present in molded composition prepared by this method is typically greater than that prepared by incorporation of short fibers and the predominant portion of the long glass fibers present have a length >4 mm in the molded part. Such long fiber glass reinforced compositions can be used for different molding techniques such as injection molding, compression molding, thermoforming and the like. As in the case of short fibers, the long fibers may also be treated with a variety of coupling agents to improve adhesion to resin. For those skilled in the art, a continuous process such as pultrusion technique for direct incorporation of long glass fibers in high flow polyester compositions will also be possible.

Additionally PET-derived PBT can be incorporated into chopped strands of glass as a powder in a papermaking process. PET-derived PBT can be incorporated into continuous glass tapes through a pultrusion or a powder incorporation method or through a rod or shape pultrusion process.

Other fillers and reinforcing agents may be used alone or in combination with reinforcing fibers. These include but are not limited to: carbon fibrils, mica, talc, barytes, calcium carbonate, wollastonite, milled glass, flaked glass, ground quartz, silica, zeolites, and solid or hollow glass beads or spheres, polyester fibers or aramid fibers.

The glass fibers may be blended first with the PET-derived PBT component and then fed to an extruder and the extrudate cut into pellets, or, in a preferred embodiment, they may be separately fed to the feed hopper of an extruder. In a highly suitable embodiment, the glass fibers may be fed downstream in the extruder to minimize attrition of the glass. Generally, for preparing pellets of the composition set forth herein, the extruder is maintained at a temperature of approximately 480° F. to 550° F. (249 to 287° C.). The pellets so prepared when cutting the extrudate may be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

In one embodiment, the filler component includes nanofillers. Suitable nanofillers can include silicates, generally clays, in particular phyllosilicates such as montmorillonite, nontronite, beidelite, volkonskoite, hectorite, saponite, sauconite, magadiite, medmontite, fluorohectorite, vermiculite, kaolinite. Clays, in particular phyllosilicates, which have a lamellar structure, contain for example alkali cations such as $K^+$ or $Na^+$ or alkaline-earth cations or even organic cations such as alkylammonium or alkylsulphonium ions, obtained by ion exchange reactions, between their lamellae. Other nanoparticle includes, nano particles of metal oxides such as titanium oxides, silicon oxides, and the like.

The fillers can include organic fibers. Organic fibers include and are not limited to synthetic polymer fibers such as polyamides, e.g., Kevlar™ fibers, or natural fibers. Examples of suitable fibers include coconut fibers, jute fibers, flax fibers, and naturally occurring cellulosic fibers. These fibers can be used individually or in combination with other fibers or other filler described herein. Since natural fibers are derived from biomass, such as plant sources, such a feature is attractive to some customers who are increasingly interested in using such materials. Also, the use of organic or natural fibers generally result in parts having a relative low densities and relatively lower weights.

The amount of the filler component in a composition used to make an article is generally at least 1 wt. %. In one embodiment, the amount of the filler component ranges from 5 wt. % to 70 wt. %. In another embodiment, the amount of the filler component ranges from 30 to 50 wt. %.

The amounts of fillers can depend on the types of fillers and the applications.

When organic fibers are used as fillers, the amount of organic fibers can range from 1 to 50 wt. %. In one embodiment, for instance, the fillers are present in an amount that is at least 1 wt. %, where fillers are selected from the group of glass fillers, ceramic fillers, carbon fillers, metal fillers, mineral fillers, nano-fillers, nano-tubes, talc, and combinations thereof. In another embodiment, the fillers are nanotubes and the nanotubes are present in an amount that is more than 0 and less than 1 wt. %. In another embodiment, the fillers are nanotubes and the nanotubes are present in an amount from 0.0001 to less than 1 wt. %. In one embodiment, the amount of the filler component ranges from 5 wt. % to 70 wt. %. In another embodiment, the amount of the filler component ranges from 30 to 50 wt. %. In another embodiment, the composition contain an inorganic filler in sufficient amounts to increase the heat deflection temperature of the composition, as compared to the composition without the inorganic filler. An artisan, however, will appreciate the amounts for specific materials can vary, depending on the embodiments. Low levels, e.g., from 0.1 to 10.0 wt. % of fillers having a very small particle size (where largest particles are less than 10 microns in diameter) are useful in one embodiment.

In one embodiment, a composition contains a flame retarding component. The flame-retarding component can be added the composition to suppress, reduce, delay or modify the propagation of a flame through a composition or an article based on the composition. The flame-retarding component can be halogenated hydrocarbons (chlorine and bromine containing compounds and reactive flame retardants), inorganic flame retardants (boron compounds, antimony oxides, aluminum hydroxide, molybdenum compounds, zinc and magnesium oxides), phosphorous containing compounds (organic phosphates, phosphinates, phosphites, phosphonates, phosphene, halogenated phosphorus compounds and inorganic phosphorus containing salts) and nitrogen containing compounds like melamine cyanurate.

Inorganic flame retardants can include metal hydroxides, antimony compounds, boron compounds, other metal compounds, phosphorous compounds, other inorganic flame-retarding compounds. Examples of suitable metal hydroxides include magnesium hydroxide, aluminum hydroxide, and other metal hydroxides. Examples of suitable antimony-based flame retardants include antimony trioxide, sodium antimonate, antimony pentoxide, and other antimony-based inorganic compounds. Examples of suitable boron compounds include zinc borate, boric acid, borax, as well as other boron-based inorganic compounds. Examples of other metal compounds include molybdenum compounds, molybdenum trioxide, ammonium octa molybdate (AOM), zirconium compounds, titanium compounds, zinc compounds such as zinc stannate, zinc hydroxy-stannate, as well as others.

The flame retarding component can include halogen-containing compounds. Examples of suitable halogenated organic flame retardants can include brominated flame retardants, chlorinated flame retardants. Examples of such flame retardants include tetrabromobisphenol A, octabromobiphenyl ether, decabromodiphenyl ether, bis(tribromophenoxy) ethane, tetrabromobiphenyl ether, hexabromocyclododecane, tribromophenol, bis(tribromophenoxy) ethane tetrabromobisphenol A polycarbonate oligomers, tetrabromobisphenol A epoxy oligomers. Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

Chlorinated flame retardants include chlorinated paraffins, bis (hexachlorocyclopentadieno)cyclo-octane as well other such functionally equivalent materials.

The flame-retarding component can include phosphorous-containing compounds. Examples of suitable phosphorous flame retardants include red phosphorous, ammonium polyphosphate. Organophoshorous flame retardants can include halogenated phosphates, non-halogenated compounds. Examples of such materials include tris(1-chloro-2-propyl) phosphate, tris(2-chloroethyl) phosphate, tris(2,3-dibromopropyl) phosphate, phosphate esters, trialkyl phosphates, triaryl phosphates, aryl-alkyl phosphates, and combinations thereof. Other flame retardants can include polyols, phosphonium derivatives, phosphonates, phosphanes, phosphines.

Specific structures of phosphorous-containing compounds are discussed below:

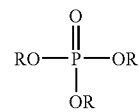

phosphate, where R can be selected from the group of alkyl, aryl, aralkyl, cyclohexyl, isopropyl, isobutyl, and the like.

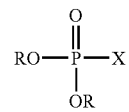

phosphonate, where X is H, and R, where R can be selected from the group of alkyl, aryl, aralkyl, cyclohexyl, isopropyl, isobutyl, and the like.

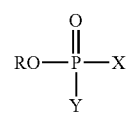

phosphinate, where X and Y═H, and R, where R can be selected from the group of alkyl, aryl, aralkyl, cyclohexyl, isopropyl, isobutyl, and the like, OH, amino functionalized compounds.

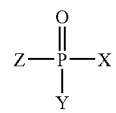

phosphine oxide, where X, Y, Z═H and R, where R can be selected from the group of alkyl, aryl, aralkyl, cyclohexyl, isopropyl, isobutyl, and the like.

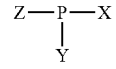

phosphine, where x, y, and z can be selected from the group of H, alkyl, aryl, aralkyl, and the like.

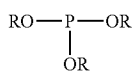

phosphite, where R can be selected from the group of alkyl, aryl, aralkyl, cyclohexyl, isopropyl, isobutyl, and the like, and H.

As such, suitable flame-retarding that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like. Di- or polyfunctional aromatic phosphorus-containing compounds are also useful, for example, compounds of the formulas below:

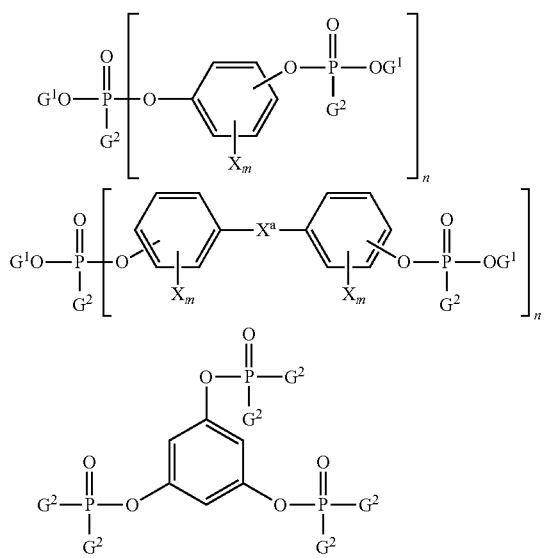

wherein each $G^1$ is independently a hydrocarbon having 1 to about 30 carbon atoms; each $G^2$ is independently a hydrocarbon or hydrocarbonoxy having 1 to about 30 carbon atoms; each $X_m$ is independently a bromine or chlorine; m is 0 to 4; and n is 1 to about 30. Examples of suitable di- or polyfunctional aromatic phosphorus-containing compounds include resorcinol tetraphenyl diphosphate (RDP), the bis (diphenyl) phosphate of hydroquinone and the bis(diphenyl) phosphate of bisphenol-A, respectively, their oligomeric and polymeric counterparts, and the like.

Exemplary suitable flame-retarding compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants are generally present in amounts of about 1 to about 20 parts by weight, based on 100 parts by weight of the total composition.

In one embodiment, the flame-retarding polyester composition includes a flame retarding quantity of one or a mixture of nitrogen-containing flame retardants such as triazines, guanidines, cyanurates, and isocyanurates. Suitable triazines have the formula

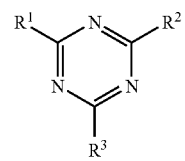

wherein R1, R2, and R3 are independently C1-C12 alkyl, C1-C12 alkoxyl, C6-C12 aryl, amino, C1-C12 alkyl-substituted amino, or hydrogen. Highly suitable triazines include 2,4,6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid may be used in the composition. Examples include melamine pyrophosphate and melamine polyphosphate. Suitable cyanurate/isocyanurate compounds include salts/adducts of the triazine compounds with cyanuric acid, such as melamine cyanurate and any mixtures of melamine salts.

Suitable guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame-retardants are used in combination with one or more phosphorous-based compounds. The phosphinates and diphosphinates include those set forth in U.S. Pat. No. 6,255,371 to Schosser et al. Specific phosphinates mentioned include aluminum diethylphosphinate (DEPAL), and zinc diethylphosphinate (DEPZN). The phosphinates have the formula (I)

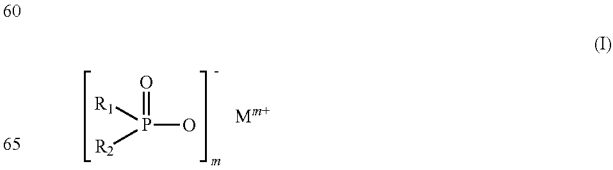

and/or formula II

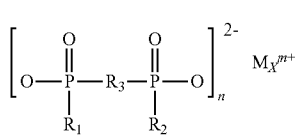

and or polymers comprising such formula I or II, where R1 and R2 are identical or different and are H, C1-C6-alkyl, linear or branched, and/or aryl; R3 is C1-C10, alkylene, linear or branched, C6-C10-arylene, -alkylarylene or -arylalkylene; M is any metal, but suitable are magnesium, calcium, aluminum or zinc, m is 1, 2 or 3; n is 1, 2 or 3; x is 1 or 2.

In one embodiment, R1 and R2 can be H, in addition to the substituents referred to set forth. This results in a hypophosphite, a subset of phosphinate, such as Calcium hypophosphite, aluminum hypophosphite and the like.

The flame retardants are typically used with a synergist, particularly inorganic antimony compounds. Such compounds are widely available or can be made in known ways. Typical, inorganic synergist compounds include $Sb_2O_5$, $SbS_3$, sodium antimonate and the like. Especially suitable is antimony trioxide ($Sb_2O_3$). Synergists, such as antimony oxides, are typically used at about 0.5 to 15 by weight based on the weight percent of resin in the final composition.

Also, the final composition may contain poly(tetrafluoro ethylene) (PTFE) type resins or copolymers used to reduce dripping in flame-retarding thermoplastics.

Flame-retardant additives are desirably present in an amount at least sufficient to reduce the flammability of the polyester resin, preferably to a UL94 V-0 rating. The amount will vary with the nature of the resin and with the efficiency of the additive. The amount of the flame retarding component is generally at least 1 wt. %. In one embodiment, the amount of the flame retarding component ranges from 5 wt. % to 30 wt. %. In another embodiment, the amount of the flame retarding component ranges from 10 to 20 wt. %.

The thermoplastic composition includes a polycarbonate component. As used herein, the terms "polycarbonate" and "polycarbonate resin" mean compositions having repeating structural carbonate units of the formula (1):

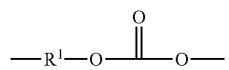

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

wherein each of $A^1$ and $A^2$ is a monocyclic divalent aryl radical and $Y^2$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O_2)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

As used herein, the term "aliphatic" refers to a hydrocarbon radical having a valence of at least one comprising a linear or branched array of carbon atoms which is not cyclic; "aromatic" refers to a radical having a valence of at least one comprising at least one aromatic group; "cycloaliphatic" refers to a radical having a valence of at least one comprising an array of carbon atoms which is cyclic but not aromatic; "alkyl" refers to a straight or branched chain monovalent hydrocarbon radical; "alkylene" refers to a straight or branched chain divalent hydrocarbon radical; "alkylidene" refers to a straight or branched chain divalent hydrocarbon radical, with both valences on a single common carbon atom; "alkenyl" refers to a straight or branched chain monovalent hydrocarbon radical having at least two carbons joined by a carbon-carbon double bond; "cycloalkyl" refers to a non-aromatic alicyclic monovalent hydrocarbon radical having at least three carbon atoms, with at least one degree of unsaturation; "cycloalkylene" refers to a non-aromatic alicyclic divalent hydrocarbon radical having at least three carbon atoms, with at least one degree of unsaturation; "aryl" refers to a monovalent aromatic benzene ring radical, or to an optionally substituted benzene ring system radical system fused to at least one optionally substituted benzene rings; "arylene" refers to a benzene ring diradical or to a benzene ring system diradical fused to at least one optionally substituted benzene rings; "acyl" refers to a monovalent hydrocarbon radical joined to a carbonyl carbon atom, wherein the carbonyl carbon further connects to an adjoining group; "alkylaryl" refers to an alkyl group as defined above substituted onto an aryl as defined above; "arylalkyl" refers to an aryl group as defined above substituted onto an alkyl as defined above; "alkoxy" refers to an alkyl group as defined above connected through an oxygen radical to an adjoining group; "aryloxy" refers to an aryl group as defined above connected through an oxygen radical to an adjoining group; and "direct bond", where part of a structural variable specification, refers to the direct joining of the substituents preceding and succeeding the variable taken as a "direct bond."

Polycarbonates may be produced by the interfacial reaction of dihydroxy compounds having the formula HO—$R^1$—OH, which includes dihydroxy compounds of formula (3)

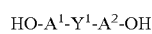

wherein $Y^1$, $A^1$ and $A^2$ are as described above. Also included are bisphenol compounds of general formula (4):

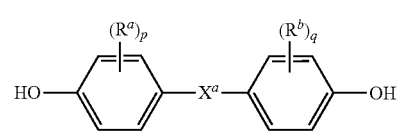

wherein $R^a$ and $R^b$ each represent a halogen atom or a monovalent hydrocarbon group and may be the same or different; p and q are each independently integers of 0 to 4; and $X^a$ represents one of the groups of formula (5):

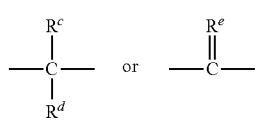

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphtalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl) phenylmethane, 2,2-bis(4-hydroxy-3-bromo-phenyl) propane, 1,1-bis (hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds represented by formula 3 include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, 3,3-bis (4-hydroxyphenyl) phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of 0.05 to 2.0 wt. % of the polycarbonate. All types of polycarbonate end groups are contemplated as being useful in the polycarbonate, provided that such end groups do not significantly affect desired properties of the thermoplastic compositions.

In a specific embodiment, the polycarbonate is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of 0.3 to 1.5 deciliters per gram (dl/g), specifically 0.45 to 1.0 dl/g. The polycarbonates may have a weight average molecular weight (Mw) of 10,000 to 100,000, as measured by gel permeation chromatography (GPC) using a crosslinked styrene-divinyl benzene column, at a sample concentration of 1 milligram per milliliter, and as calibrated with polycarbonate standards.

"Polycarbonates" and "polycarbonate resin" as used herein may include copolymers comprising carbonate chain units. A specific suitable copolymer is a polyester-polycarbonate, also known as a copolyester-polycarbonate and polyester-carbonate. Combinations of polycarbonates and polyester-polycarbonates may also be used. As used herein, a "combination" is inclusive of all mixtures, blends, alloys, reaction products, and the like. Polyester-polycarbonates contain, in addition to recurring carbonate chain units of the formula (1), repeating units of formula (6):

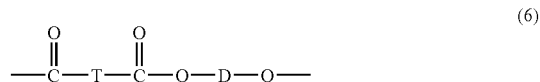

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexanedicarboxylic acid, or mixtures thereof. A specific dicarboxylic acid comprises a mixture of isophthalic acid and terephthalic acid wherein the weight ratio of terephthalic acid to isophthalic acid is 91:1 to 2:98. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In addition to the ester units, the polyester-polycarbonates comprise carbonate units as described hereinabove. Carbonate units of formula (1) may also be derived from aromatic dihydroxy compounds of formula (7), wherein specific carbonate units are resorcinol carbonate units.

Specifically, the polyester unit of a polyester-polycarbonate can be derived from the reaction of a combination of isophthalic and terephthalic diacids (or derivatives thereof) with resorcinol, bisphenol A, or a combination comprising one or more of these, wherein the molar ratio of isophthalate units to terephthalate units is 91:9 to 2:98, specifically 85:15 to 3:97, more specifically 80:20 to 5:95, and still more specifically 70:30 to 10:90. The polycarbonate units can be derived from resorcinol and/or bisphenol A, in a molar ratio of resorcinol carbonate units to bisphenol A carbonate units of 0:100 to 99:1, and the molar ratio of the mixed isophthalate-terephthalate polyester units to the polycarbonate units in the polyester-polycarbonate can be 1:99 to 99:1, specifically 5:95 to 90:10, more specifically 10:90 to 80:20. Where a blend of polyester-polycarbonate with polycarbonate is used, the weight ratio of polycarbonate to polyester-polycarbonate in the blend can be, respectively, 1:99 to 99:1, specifically 10:90 to 90:10.

The polyester-polycarbonates may have a weight-averaged molecular weight (Mw) of 1,500 to 100,000, specifically 1,700 to 50,000, and more specifically 2,000 to 40,000. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. A chain stopper (also referred to as a capping agent) may be included during polymerization. The chain-stopper limits molecular weight growth rate, and so controls molecular weight in the polycarbonate. A chain-stopper may be at least one of mono-phenolic compounds, mono-carboxylic acid chlorides, and/or mono-chloroformates.

For example, mono-phenolic compounds suitable as chain stoppers include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Specifically, mono-phenolic chain-stoppers include phenol, p-cumylphenol, and/or resorcinol monobenzoate.

Mono-carboxylic acid chlorides may also be suitable as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides such as trimellitic anhydride chloride, and naphthoyl chloride; and mixtures of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof The polyester-polycarbonates may be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each R3 is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst may be 0.1 to 10 wt % based on the weight of bisphenol in the phosgenation mixture. In another embodiment an effective amount of phase transfer catalyst may be 0.5 to 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

In addition to the polycarbonates, polyester-polycarbonates, and combinations of these as described above, it is also possible to use combinations of the polycarbonates and polyester-polycarbonates with other thermoplastic polymers, for example combinations of polycarbonates and/or polycarbonate copolymers with polyesters.

The polycarbonate may also comprise a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (8):

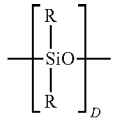 (8)

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (8) may vary widely depending on the type and relative amount of each component in the thermoplastic composition, the desired properties of the composition, and like considerations. Generally, D may have an average value of 2 to 1,000, specifically 2 to 500, and more specifically 5 to 100. In one embodiment, D has an average value of 10 to 75, and in still another embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (9):

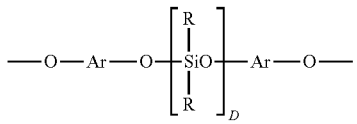 (9)

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulphide), and 1,1-bis(4-hydroxy-t-butylphenyl) propane. Combinations comprising at least one of the foregoing dihydroxy compounds may also be used.

Units of formula (9) may be derived from the corresponding dihydroxy compound of formula (10):

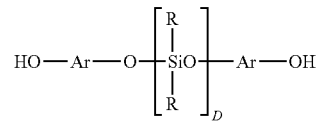 (10)

wherein R, Ar, and D are as described above. Compounds of formula (10) may be obtained by the reaction of a dihydroxyarylene compound with, for example, an alpha, omega-bisacetoxypolydiorangonosiloxane under phase transfer conditions.

In another embodiment, polydiorganosiloxane blocks comprise units of formula

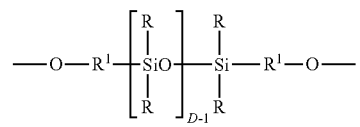 (11)

wherein R and D are as described above, and each occurrence of $R^1$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (12):

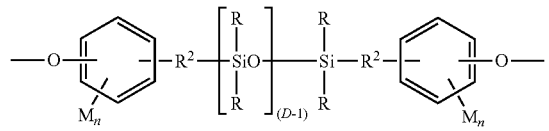 (12)

wherein R and D are as defined above. Each $R^2$ in formula (12) is independently a divalent $C_2$-$C_8$ aliphatic group. Each M in formula (12) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

Units of formula (12) may be derived from the corresponding dihydroxy polydiorganosiloxane (13):

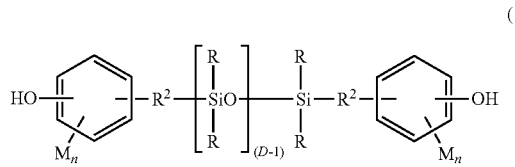

wherein R, D, M, $R^2$, and n are as described above. Such dihydroxy polysiloxanes can be made by effecting a platinum catalyzed addition between a siloxane hydride of formula (14):

wherein R and D are as previously defined, and an aliphatically unsaturated monohydric phenol. Suitable aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polysiloxane-polycarbonate may comprise 50 to 99 wt. % of carbonate units and 1 to 50 wt. % siloxane units. Within this range, the polysiloxane-polycarbonate copolymer may comprise 70 to 98 wt. %, specifically 75 to 97 wt. % of carbonate units and 2 to 30 wt. %, specifically 3 to 25 wt. % siloxane units.

In an embodiment, the polysiloxane-polycarbonate may comprise polysiloxane units, and carbonate units derived from bisphenol A, e.g., the dihydroxy compound of formula (3) in which each of $A^1$ and $A^2$ is p-phenylene and $Y^1$ is isopropylidene. Polysiloxane-polycarbonates may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C./1.2 kg, of 1 to 50 cubic centimeters per 10 minutes (cc/10 min), specifically 2 to 30 cc/10 min. Mixtures of polysiloxane-polycarbonates of different flow properties may be used to achieve the overall desired flow property.

The amount of the polycarbonate component varies with the specific application. Generally, the amount of the polycarbonate component is present in an amount ranging from 5 to 90 wt. %. In another embodiment, the amount of polycarbonate present in the composition ranges from to 20 to 70 wt. %.

The composition containing modified polybutylene terephthalate copolymers can further include an additive, e.g., additives selected from the group consisting of flame retardants, stabilizers, mold release agents, poly(tetrafluoro ethylene)-styrene acrylonitrile mixtures, and combinations thereof. A molding composition of the invention, for instance, can further contain a heat stabilizer. Suitable heat stabilizers include, but are not limited to, phenol stabilizers, organic thioether stabilizers, organic phosphide stabilizers, hindered amine stabilizers, epoxy stabilizers and mixtures thereof. The heat-resistant stabilizer may be added in the form of a solid or liquid.

The amount of the heat stabilizer that can be in the molding composition is generally at least 0.01 wt. %. In one embodiment, the amount of the heat stabilizer ranges from 0.01 to 0.5 wt. %. In another embodiment, the amount of the heat stabilizer ranges from 0.05 to 0.2 wt. %. In one embodiment, the amount of the heat stabilizer ranges from 0.01 to 1 wt. %.

Ultraviolet stabilizers can be used. In one embodiment, an ultraviolet stabilizer is present in an amount that is at least 0.05 wt. %. In another embodiment, the ultaviolet stabilizer is in an amount ranging from 0.05 to 1 wt. %.

In another embodiment, in addition to containing the PET-derived modified PBT component, a molding composition can further include mold-release agents. Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, and mixtures of any of the aforementioned. The mold release agent can be used in conjunction with other additives, e.g., poly(tetrafluoro ethylene) styrene acrylonitrile The amount of the mold release agent can be in the molding composition is generally at least 0.1 wt. %. In one embodiment, the amount of the mold release agent ranges from 0.1 to 2 wt. %. In another embodiment, the amount of the mold release agent ranges from 0.5 to 1 wt. %. In one embodiment, the amount of the mold release agent ranges from 0.01 to 0.5 wt. %.

The carboxy-reactive material is a monofunctional, or a polyfunctional carboxy-reactive material that can be either polymeric or non-polymeric. Examples of carboxy-reactive groups include epoxides, carbodiimides, orthoesters, oxazolines, oxiranes, aziridines, and anhydrides. The carboxy-reactive material can also include other functionalities that are either reactive or non-reactive under the described processing conditions. Non-limiting examples of reactive moieties include reactive silicon-containing materials, for example epoxy-modified silicone and silane monomers and polymers. If desired, a catalyst or co-catalyst system can be used to accelerate the reaction between the carboxy-reactive material and the polyester.

The term "polyfunctional" or "multifunctional" in connection with the carboxy-reactive material means that at least two carboxy-reactive groups are present in each molecule of the material. Particularly useful polyfunctional carboxy-reactive materials include materials with at least two reactive epoxy groups. The polyfunctional epoxy material can contain aromatic and/or aliphatic residues. Examples include epoxy novolac resins, epoxidized vegetable (e.g., soybean, linseed) oils, tetraphenylethylene epoxide, styrene-acrylic copolymers containing pendant glycidyl groups, glycidyl methacrylate-containing polymers and copolymers, and difunctional epoxy compounds such as 3,4-epoxycyclohexylmethyl-3,4-epoxycyclohexanecarboxylate. As such, our invention includes embodiments in which the carboxy reactive component selected from the group consisting of monofunctional epoxies, multifunctional epoxies, and combinations thereof.

In one embodiment, the polyfunctional carboxy-reactive material is an epoxy-functional polymer, which as used herein include oligomers. Exemplary polymers having multiple epoxy groups include the reaction products of one or more ethylenically unsaturated compounds (e.g., styrene, ethylene and the like) with an epoxy-containing ethylenically unsaturated monomer (e.g., a glycidyl $C_{1-4}$ (alkyl)acrylate, allyl glycidyl ethacrylate, and glycidyl itoconate).

For example, in one embodiment the polyfunctional carboxy-reactive material is a styrene-acrylic copolymer (including an oligomer) containing glycidyl groups incorporated as side chains. Several useful examples are described in the International Patent Application WO 03/066704 A1, assigned to Johnson Polymer, LLC, which is incorporated herein by reference in its entirety. These materials are based on copolymers with styrene and acrylate building blocks that have glycidyl groups incorporated as side chains. A high number of epoxy groups per polymer chain is desired, at least about 10, for example, or greater than about 15, or greater than about 20. These polymeric materials generally have a molecular weight greater than about 3000, preferably greater than about 4000, and more preferably greater than about 6000. These are commercially available from Johnson Polymer, LLC under the Joncryl® trade name, preferably the Joncryl® ADR 4368 material.

Another example of a carboxy-reactive copolymer is the reaction product of an epoxy-functional $C_{1-4}$(alkyl)acrylic monomer with a non-functional styrenic and/or $C_{1-4}$(alkyl) acrylate and/or olefin monomer. In one embodiment the epoxy polymer is the reaction product of an epoxy-functional (meth)acrylic monomer and a non-functional styrenic and/or (meth)acrylate monomer. These carboxy reactive materials are characterized by relatively low molecular weights. In another embodiment, the carboxy reactive material is an epoxy-functional styrene (meth)acrylic copolymer produced from an epoxy functional (meth)acrylic monomer and styrene. As used herein, the term "(meth)acrylic" includes both acrylic and methacrylic monomers, and the term "(meth) acrylate includes both acrylate and methacrylate monomers. Examples of specific epoxy-functional (meth)acrylic monomers include, but are not limited to, those containing 1,2-epoxy groups such as glycidyl acrylate and glycidyl methacrylate.

Suitable $C_{1-4}$(alkyl)acrylate comonomers include, but are not limited to, acrylate and methacrylate monomers such as methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Combinations comprising at least one of the foregoing comonomers can be used.

Suitable styrenic monomers include, but are not limited to, styrene, alpha-methyl styrene, vinyl toluene, p-methyl styrene, t-butyl styrene, o-chlorostyrene, and mixtures comprising at least one of the foregoing. In certain embodiments the styrenic monomer is styrene and/or alpha-methyl styrene.

In another embodiment, the carboxy reactive material is an epoxy compound having two terminal epoxy functionalities, and optionally additional epoxy (or other) functionalities. The compound can further contain only carbon, hydrogen, and oxygen. Difunctional epoxy compounds, in particular those containing only carbon, hydrogen, and oxygen can have a molecular weight of below about 1000 g/mol, to facilitate blending with the polyester resin. In one embodiment the difunctional epoxy compounds have at least one of the epoxide groups on a cyclohexane ring. Exemplary difunctional epoxy compounds include, but are not limited to, 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl) adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate.

The difunctional epoxide compounds can be made by techniques well known to those skilled in the art. For example, the corresponding $\alpha$- or $\beta$-dihydroxy compounds can be dehydrated to produce the epoxide groups, or the corresponding unsaturated compounds can be epoxidized by treatment with a peracid, such as peracetic acid, in well-known techniques. The compounds are also commercially available.

Other preferred materials with multiple epoxy groups are acrylic and/or polyolefin copolymers and oligomers containing glycidyl groups incorporated as side chains. Suitable epoxy-functional materials are available from Dow Chemical Company under the tradename D.E.R.332, D.E.R.661, and D.E.R.667; from Resolution Performance Products under the trade name EPON Resin 1001F, 1004F, 1005F, 1007F, and 1009F; from Shell Oil Corporation under the tradenames Epon 826, 828, and 871; from Ciba-Geigy Corporation under the tradenames CY-182 and CY-183; and from Dow Chemical Co. under the tradename ERL-4221 and ERL-4299. As set forth in the Examples, Johnson Polymer Co is a supplier of an epoxy functionalized material known as ADR4368 and 4300. A further example of a polyfunctional carboxy-reactive material is a co- or terpolymer including units of ethylene and glycidyl methacrylate (GMA), sold by Arkema under the trade name LOTADER®.

In still another embodiment, the carboxy-reactive material is a multifunctional material having two or more reactive groups, wherein at least one of the groups is an epoxy group and at least one of the groups is a group reactive with the polyester, but is not an epoxy group. The second reactive group can be a hydroxyl, an isocyanate, a silane, and the like.

Examples of such multifunctional carboxy-reactive materials include materials with a combination of epoxy and silane functional groups, preferably terminal epoxy and silane groups. The epoxy silane is generally any kind of epoxy silane wherein the epoxy is at one end of the molecule and attached to a cycloaliphatic group and the silane is at the other end of the molecule. A desired epoxy silane within that general description is of the following formula:

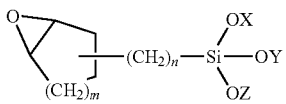

wherein m is an integer of 1, 2 or 3, n is an integer of 1 to 6, inclusive, and X, Y, and Z are the same or different, preferably the same, and are alkyl groups of one to twenty carbon atoms, inclusive, cycloalkyl of four to ten carbon atoms, inclusive, alkylene phenyl wherein alkylene is one to ten carbon atoms, inclusive, and phenylene alkyl wherein alkyl is one to six carbon atoms, inclusive. Desirable epoxy silanes within this range are compounds wherein m is 2, n is 1 or 2, desirably 2, and X, Y, and Z are the same and are alkyl of 1, 2, or 3 carbon atoms inclusive. Epoxy silanes within the range which in particular can be used are those wherein m is 2, n is 2, and X, Y, and Z are the same and are methyl or ethyl.

Such materials include, for example, β-(3,4-epoxycyclohexyl) ethyltriethoxysilane, available under the trade name CoatOSil 1770 from GE. Other examples are β-(3,4-epoxycyclohexyl) ethyltrimethoxysilane, available under the trade name Silquest A-186 from GE, and 3-glycidoxypropyltriethoxysilane, available under the trade name Silquest Y-15589 from GE.

The carboxy-reactive material is added to the polyester compositions in amounts effective to improve visual and/or measured physical properties. In one embodiment, the carboxy-reactive materials are added to the polyester compositions in an amount effective to improve the solvent resistance of the composition, in particular the fuel-resistance of the composition. A person skilled in the art may determine the optimum type and amount of any given carboxy-reactive material without undue experimentation, using the guidelines provided herein.

The type and amount of the carboxy reactive material will depend on the desired characteristics of the composition, the type of polyester used, the type and amount of other additives present in the composition and like considerations, and is generally at least 0.01 weight percent (wt. %) based on the weight of the total composition. In one embodiment, the amount of the carboxy-reactive material is 0.01 to 20 wt. %. In one embodiment, the amount of the carboxy-reactive material is 0.01 to 30 wt. %., or more.

The impact modifier component is generally a rubbery material, which when used in suitable amounts, imparts energy absorbing properties to the composition. Suitable rubbery impact modifiers include (a) methacrylate butadiene styrene rubbers, (b) acrylate rubbers, (c) acrylonitrile-styrene-acrylate rubbers, (d) high rubber graft acrylonitrile-butadiene-styrenes, (e) acrylate-olefin copolymers, (f) polyolefin modifiers, or (g) silicone-acrylic modifiers (e.g., METABLEN™ S made by Mitsubishi Rayon). In one embodiment, the impact modifier is selected from the group consisting of methacrylate butadiene styrene rubbers, acrylate rubbers, acrylonitrile-styrene-acrylate rubbers, high rubber graft acrylonitrile-butadiene-styrene, silicone-acrylic modifiers, and combinations thereof.

More particularly, the impact modifier can include an acrylonitrile-butadiene-styrene (ABS) polymer of the high rubber graft impact modifier. Rubber modified monovinylidene aromatic resins comprising (a) a rubber modified monovinylidene aromatic graft copolymer and (b) an ungrafted rigid copolymer, are generally prepared by graft polymerization of a mixture of a monovinylidene aromatic monomer and one or more comonomers in the presence of one or more rubbery polymeric substrates. Depending on the amount of rubber present, a separate matrix or continuous rigid phase of ungrafted rigid (co)polymer may be simultaneously obtained along with the rubber modified monovinylidene aromatic graft polymer. The resins may also be produced by blending a rigid monovinylidene aromatic copolymer with one or more rubber modified monovinylidene aromatic graft copolymers.

Typically, the rubber modified resins comprise the rubber modified graft copolymer at a level of from 5 to 100 percent by weight based on the total weight of the resin, more preferably from 10 to 95 percent by weight thereof, more preferably 20 to 90 percent by weight thereof, and most preferably from 15 to 85 percent by weight thereof; and the rubber modified resin comprises the ungrafted rigid polymer at a level of from 0 to 95 percent by weight based on the total weight of the resin, more preferably from 5 to 90 percent by weight thereof, more preferably from 10 to 80 percent by weight thereof and most preferably from 15 to 85 percent by weight thereof. Higher levels of rubber are preferred.

Especially preferred are acrylonitrile-butadiene-styrene copolymers having greater than 30% by weight rubbery polymeric substrate, preferable greater than about 45% by weight rubbery polymeric substrate. The most preferred rubbery substrates comprise polybutadiene or styrene-butadiene copolymer. Also preferred are high rubber graft acrolonitrile-butadiene-styrene copolymer. The phrase "high rubber graft" refers generally to graft copolymer resins wherein at least about 30% by weight, preferably at least about 45% by weight of the rigid polymeric phase is chemically bound or grafted to the rubbery polymeric phase. Suitable ABS-type high rubber graft copolymers are commercially available from, for example, under the trademark BLENDEX®) resin grade 336 or 338. One preferred high rubber graft is CYCOLAC®) C874202 resin of General Electric Company, Advanced Materials. A process for producing graft copolymer resins is set forth in U.S. Pat. No. 6,384,129 to Lowry entitled Semibatch Emulsion Process for Making Diene Rubber Latex, Rubber Latex Made Thereby, and Graft Copolymer Made Therefrom.

Other typical impact modifiers are the following materials, or blends of two or more of these materials: (1) Paraloid EXL3300, which is Butylacylate-Methacrylate core-shell rubber; (2) ASA-HRG, which is Acrylonitrile-Styrene-ButylAcrylate copolymer; (3) AES, which is Acrylonitrile-Styrene-EPDM copolymer, where EPDM is ethylene-propylene non conjugated diene elastomer; (4) Lotader AX8900, which is Ethylene-Methacrylate-Glycidylmethacrylate copolymer with Methacylate content of around 8%. The content of impact modifier is preferable less than 40% by weight, more preferable less than 30 percent, and most preferable less than 20 percent.

Core-shell copolymers, method of making core-shell copolymers and the use of core-shell copolymers as impact modifiers in combination with polycarbonate are described in U.S. Pat. Nos. 3,864,428 and 4,264,487. Suitable core-shell copolymers are those that include a rubbery "core" that has a glass transition temperature ("Tg") below about 10° C. and that comprises repeating units derived from one or more monoethylenically unsaturated monomers such as, e.g. acylate monomers, e.g. butyl acylate, and conjugated diene monomers, e.g., butadiene and a rigid "shell" that has a Tg of greater than or equal to about 10° C. and that has repeating units derived from a monoethylenically unsaturated monomer.

The amount of the impact modifier is generally at least 1 wt. %. In one embodiment, the amount of the impact modifier ranges from 1 wt. % to 50 wt. %. In another embodiment, the amount of the impact modifier ranges from 5 to 25 wt. %.

The composition can contain additional polyesters. In one embodiment, the composition contains a polyester that does not contain a modified polybutylene terephthalate derived from polyethylene terephthalate. As such, our invention includes embodiments in which the composition also contains second polyester component that does not contain a modified polybutylene terephthalate derived from polyethylene terephthalate.

A molding composition of the invention is generally made by combining suitable amounts of the filler component, the PET-derived PBT component, in an extruder (or a functionally equivalent compounding device) under suitable conditions. The PET-derived PBT component, the filler component (and any additional components) may be compounded simultaneously, separately, or in combinations containing two or three of the components. The extrusion process can include one or more passes through an extruder.

Our invention includes methods for making compositions and articles. Our invention, for instance, includes a method of forming a composition comprising melt blending the components of any of our compositions. The method can include shaping, extruding, or molding the melt blended composition. Methods can include molding a melt blended composition into suitable articles. And our compositions include articles derived from any of our compositions.

The molding compositions of the invention impart physical properties that are useful in various applications. For instance, the impact resistance properties imparted by the molding composition of the invention is generally at least 10 lb-ft/inch (500 J/m for unnotched izod) at room temperature. In one embodiment, the impact resistance imparted by the molding composition ranges from 500 to 2500 J/m. In another embodiment, the impact resistance imparted by the molding composition ranges from 870 to 950 J/m.

The melt volume rate (at 250° C. and 5 kgf) is generally ranges from 5 to 30 cc/10 minutes (min). In another embodiment, the melt volume rate is 15 cc/10 min. The tensile modulus of elasticity (MPa) of a molding composition is generally at least 5000 MPa. In another embodiment, the tensile modulus of elasticity of the molding composition ranges from 5000 MPa to 50,000 Mpa. In another embodiment, the tensile modulus of elasticity ranges from 24000 to 29000 MPa.

The tensile elongation @yield (%) of a molding composition is generally at least 0.5%. In another embodiment, the tensile elongation @yield (%) ranges from 0.5% to 5%. In one embodiment, the tensile elongation @yield (%) ranges from 1.3 to 1.6%. The tensile elongation @break (%) imparted by a molding composition is generally at least 0.5%. In another embodiment, the tensile elongation @break (%) ranges from 0.5% to 5%. In one embodiment, the tensile elongation @break (%) ranges from 1.3 to 1.6%. The tensile stress @yield (MPa) imparted by a molding composition is generally at least 30 MPa. In another embodiment, the tensile stress @yield (MPa) ranges from 30 MPa to 100 Mpa. In one embodiment, the tensile stress @yield (MPa) ranges from 46.8 to 47.5 MPa.

The tensile stress @break (MPa) imparted by a molding composition is generally at least 50 MPa. In another embodiment, the tensile stress @break (MPa) ranges from 50 to 300 MPa. In one embodiment, the tensile stress @break (MPa) ranges from 149.7 to 153.5 MPa. The flexural modulus (MPa) imparted by a molding composition is generally at least 5000 MPa. In one embodiment, the flexural modulus (MPa) ranges from 5000 to 50000 MPa. In another embodiment, the flexural modulus (MPa) ranges from 13500 to 14050 MPa. The flexural stress @yield (MPa) imparted by a molding composition is generally at least 100 MPa. In another embodiment, the flexural stress @yield (MPa) ranges from 100 to 400 MPa. In one embodiment, the flexural stress @yield (MPa) ranges from 235 to 245 MPa.

The heat deflection temperature at 1.82 MPa for 3.2 mm bars imparted by a molding composition is generally at least 50° C. In another embodiment, the heat deflection temperature ranges from 50° C. to 300° C. In one embodiment, the heat deflection temperature ranges from 199 to 205° C. Compositions can include materials that affect the properties of the composition. The composition, for instance, can further include a material capable of increasing the heat deflection temperature of the composition by at least from 1 to 10° C. Such a material can be selected from the group consisting of talcs having fine particles, nanoparticles, poly(tetrafluoro ethylene), clays, mica, and combinations thereof.

The mold shrinkage imparted by a molding composition is generally lesser than 5%. In one embodiment, the mold shrinkage ranges from 0 to 5%. In another embodiment, the mold shrinkage ranges from 0.52 to 0.56%. The inherent viscosity of the composition can vary. In one embodiment, the composition has an inherent viscosity that is greater than 0.55 dL/g.

A composition can exhibit a melt volume rate (MVR) that is higher than the MVR of the same composition made with monomer based polybutylene terephthalate homopolymers instead of the modified random polybutylene terephthalate random copolymers. A composition, for instance, can have a melt volume rate that is at least 10% higher as compared to a composition made with monomer based polybutylene terephthalate homopolymers, as measured on pellets according to ISO 1133 method at 250° C. and 5 kgf at dwelling time of 240 seconds and a 2.1 mm orifice. In one embodiment, the composition can have a melt volume rate is from 10% to 80% higher, as compared to a composition made with monomer-derived polybutylene terephthalate homopolymers instead of the Polybutylene terephthalate random copolymers, as measured on pellets according to ISO 1133 method at 250° C. and 5 kgf at dwelling time of 240 seconds and a 2.1 mm orifice. In another embodiment, the composition can have a heat deflection temperature that is at least 80° C., as determined by ASTM D648 at 0.455 MPa.

The invention contains embodiments in which a composition imparts to a member selected from the group consisting of the composition, an article molded from the composition, an article extruded from the composition, a heat deflection temperature that is lower as compared to a composition that contains polybutylene terephthalate that is derived from monomers and a melt flow rate that is higher as compared to a composition that contains polybutylene terephthalate that is derived from monomers. In another embodiment, the composition further comprises an inorganic filler in sufficient amounts to increase the heat deflection temperature of the composition, as compared to the composition without the inorganic filler. In another embodiment, the composition further comprises an organic additive in sufficient amounts to increase the heat deflection temperature of the composition, as compared to the composition without the organic additive.

The invention provides previously unavailable advantages. For instance, the invention provides molding compositions that function comparably with those based on PBT, despite using a structurally different material containing isophthalic groups and ethylene glycol groups. Since the molding compositions do not require the conventionally prepared PBT, the invention increases demand for the use of PET and thereby reduces the need to dispose PET scrap in landfills or by incineration.

Further, the process for making the PET-derived random, modified PBT copolymers used in our compositions can advantageously substantially reduce carbon dioxide emissions and solid waste. Since the PET-derived polyester random modified PBT copolymers made by the inventive process are made from scrap PET and not monomers, the process significantly reduces the amount of carbon dioxide emissions and solid waste. Carbon waste reduction (or crude oil savings) occurs because the carbon that constitutes the dimethyl terephthalate or terephthalic acid ordinarily used to make polyesters is not used, rather a PET component, e.g., polyester scrap, is replaced. The process to make DMT or TPA from crude oil is highly energy intensive and as a result, substantial emissions of CO2 to the atmosphere occur from burning of non-renewable energy sources. By not using DMT or TPA to make the PET derived PBT, carbon dioxide emissions savings are obtained. In one embodiment, the process for making PET-derived modified PBT can eliminate at least 1 kg of $CO_2$ emissions for every kilogram of PET-derived modified PBT made with the process, as compared to a process that makes virgin PBT homopolymers from monomers. In another embodiment, the process for making PET-derived modified PBT can eliminate from 1 kg to 1.5 kg, or more $CO_2$ emissions for every kilogram of PET-derived modified PBT made with the inventive process, as compared to a process that makes virgin PBT homopolymers from monomers. Additionally, there are energy savings/reduced carbon dioxide emissions when the ethylene glycol byproduct is recovered and is used instead of ordinary ethylene glycol in manufacturing.

Additionally, when the source of BDO is from biomass derived, feedstocks such as succinic acid, the carbon dioxide savings are further increased for two reasons. Bio derived succinic acid is made form sugars or other bio derived hydrocarbons that are the derived from atmospheric carbon versus fossil fuel carbon sources, thus reducing the environmental impact of the polymer derived from BDO based on succinic acid from biomass sources. Furthermore, the fermentation to yield succinic acid requires carbon dioxide as an input thus leading to further carbon dioxide reductions.

Advantageously, a molding composition containing the modified polybutylene terephthalate random copolymers can have a reduced $CO_2$ emissions index. The reduced $CO_2$ emissions index, as defined in this application, is the amount of $CO_2$, expressed in kg, that is saved when one (1) kg of a composition containing the modified polybutylene terephthalate random copolymers is made, as compared to the amount of $CO_2$, expressed in kg, that is created when the composition is made with polybutylene terephthalate that is derived from monomers. Generally, our compositions generally have a reduced $CO_2$ emissions index that is more than approximately 0.06 kg, and can range from 0.06 kg to 2.25.

The basis for this feature is discussed below. The difference between the amount of $CO_2$ that is created during ordinary processes for making virgin, monomer-derived polybutylene terephthalate homopolymers and the process for making 1 kg of the modified polybutylene terephthalate random copolymers can range from 1.3 kg to 2.5 kg, or more suitably from 1.7 kg to 2.2 kg. It should be noted that this difference is based on calculations for the entire process that starts from crude oil to the monomers to the PBT versus scrap PET to oligomers to the modified PBT. In other words, the process for making 1 kg of the modified polybutylene terephthalate random copolymers creates 1.3 to 2.5 kilograms less $CO_2$ as compared to the process for making 1 kg of virgin PBT from crude oil. To determine the ranges of the reduced $CO_2$ emissions index for our compositions (which have the modified PBT random copolymers present in an amount ranging from 5 to 90 wt. %), the $CO_2$ reduction index can be calculated by multiplying the lower amount of the polybutylene butylene terephthalate present in the composition, in percentage terms, with 1.3 (0.05×1.3=0.065) and the higher amount of the polytbutylene terephthalate times 2.5. (0.90×2.5=2.25).

These results can be derived and verified by using material and energy balance calculations (calculations that are well know in the chemical engineering art) and comparing the amount of energy used to make modified PBT random copolymers from PET and the amount of energy used to make PBT from terephthalic acid.

The invention is further described in the following illustrative examples in which all parts and percentages are by weight unless otherwise indicated.

EXAMPLES

Materials

The following Table A describes the materials used in the Examples

| Abbreviation | Description |
| --- | --- |
| PET Derived PBT (0.66 iv) | Poly(1,4-butylene terephthalate) derived from PET, intrinsic viscosity of $0.66^{dl}/g$ as measured in a 60:40 phenol/tetrachloroethane mixture |
| PET Derived PBT (1.0 iv) | Poly(1,4-butylene terephthalate) derived from PET, intrinsic viscosity of 1.0 dl/g as measured in a 60:40 phenol/tetrachloroethane mixture |
| PET Derived PBT (1.2 iv) | Poly(1,4-butylene terephthalate) derived from PET, intrinsic viscosity of 1.2 dl/g as measured in a 60:40 phenol/tetrachloroethane mixture |
| GE PBT 195 (0.66 iv) | Poly(1,4-butylene terephthalate) from General Electric Company, intrinsic viscosity of 0.66 dl/g as measured in a 60:40 phenol/tetrachloroethane mixture |
| GE PBT 315 (1.2 iv) | Poly(1,4-butylene terephthalate) from General Electric Company, intrinsic viscosity of 1.2 dl/g as measured in a 60:40 phenol/tetrachloroethane mixture |
| Lotader AX8900 | Random Terpolymer of Ethylene (E), Acrylic Ester (AE) andGlycidyl Methacrylate Ester (GMA) from Arkema |
| Seenox 412S | Thioester, Pentaerythritol tetrakis(3-(dodecylthio)propionate) sold as SEENOX 412-S from Crompton |
| IRGAPHOS 168 | Phosphite, 2,4-di-tert-butylphenol phosphite (3:1) sold as IRGAPHOS 168 from Ciba Geigy |
| ERL4221 | 3,4-epoxycyclohexylmethyl-3-4-epoxy-cyclohexyl carboxylate for DOW Chemical |
| NaSt | Sodium Stearate |
| PETS | pentaerythritol tetrastearate |

| Abbreviation | Description |
|---|---|
| Acrylic Impact Modifier | Acrylic impact modifier from Rohm and Haas EXL3330, Emulsion copolymer of methacrylate-butyl acrylate with core-shell structure. |
| PC 100 | PC bisphenol polycarbonate Lexan ® resin from General Electric Company. Mn by GPC againt polystyrene standards is 29 Kg/mol. |
| Glass Fiber | E glass with diameter of 10 or 13 um. Sizing-coated glass fibers are commercially available from Owens Coming Fiberglass as, for example, OCF K filament glass fiber 183 F. |
| Anitioxidant 60 | tetrakis(methylene(3,5-di-t-butyl-4-hydroxyhydocy |
| Brominated Epoxy | TBBPA diglycidyl ether copolymer |
| Hindered Phenol Stabilizer | Pentaerythritol-tetrakis(3,5-di-t-butyl-4-hydroxy-phenyl-)propionate) |
| HYTREL 4056 as F121 | Polybutylene tere/iso phthalate-co-polyoxybutylene |
| LEXAN 4701R-110001 | LEXAN 4701R-110001 |
| LEXAN ML8199-111N | LEXAN ML8199-111N |
| PC 80%/EMA-GMA 20% Concentrate | Concentrate (80% PC) Lotader AX8900 (20%) |
| Phosphorous Acid 45% | 45% Phosphorous Acid Solution |
| Sb2O3/PE Concentrate (80/20) | Sb2O3 Concentrate (80/20) |
| UVA234 | 2-(2-hydroxy-3,5-di-cumyl)benzotriazole Powder & Freeflowing |
| Low Density Polyethylene | Low Density Polyethylene |
| TSAN | (50 wt. % poly(tetrafluoro ethylene) encapsulated with poly(styrene-co-acrylonitrile)) |

Example 1

A modified polybutylene terephthalate random copolymer was derived from polyethylene terephthalate as follows. Clear PET bottle scrap was obtained from a commercial source. In the scrap cleaning process, the PET scrap was cleaned manually involving first a hot water wash followed by manual sorting to separate colored bottles and PVC bottles, crushing, hydrofloatation to separate PP, labels, caps etc., alkali wash to remove glue, and finally a demineralized water wash to remove alkali followed by drying. The resulting PET flakes were used as the main raw material in the depolymerization step. The post consumer recycle PET flakes had an iv specification of 0.68 to 0.78 dl/g and a melting point specification of 245 to 255° C. The PVC content was less than 10 ppm by specification. The butanediol was obtained from BASF and had a purity specification of >99.5 wt. %. The ethylene glycol was obtained from Merck and had a purity specification of >99.5 wt. %. The TPT catalyst used was the commercial Tyzor grade available from Dupont.

Depolymerization (Glycolysis) with ethylene glycol—preparation of first mixture. Depolymerization of PET flakes was carried out at a mole ratio of PET ('mer' repeat unit) to EG in the ratio ranging from 1:0.8 to 1:2.0 to make the depolymerization product. The reaction was conducted in the presence of catalyst (titanium, antimony or tin compounds (ranging from 50 to 125 ppm)) or without any added catalyst. The process was carried out under a pressure in the range 1.0 bar-6 bar and at a temperature of 200° C. to 260° C.). The total time of depolymerization was from 20 to 120 min and preferably from 30 to 100 min. This was further followed by filtration of the mass to remove black specs and other insoluble impurities. The resulting mass was called the first mixture. The depolymerization reaction conditions employed was as presented in Table 1.

TABLE 1

| Example No. | Pressure (kPa) | Temperature ° C. | Depolymerization time (min) |
|---|---|---|---|
| 1 | 350 | 230 | 95 |

Transesterification—Preparation of Second Mixture (At Atmospheric Pressure)

Transesterification was done by reacting the first mixture with BDO with or without cocatalyst. The cocatalyst can be sodium methoxide of (10-14 ppm) or other alkali metal salts. The BDO was taken in excess over the stoichiometric requirement and the mole ratio of excess to stoichiometric requirement was in the range from 2.0 to 4.0. The reaction was conducted in the presence of additional amount of catalyst (50-120 ppm of Ti, Sn or Sb catalysts or combinations thereof) at temperature ranging from 200 to 245° C. and more preferably from 210 to 235° C. at atmospheric pressure for 10-40 min and more preferably 15-30 min. During this period, the vapors were passed through a distillation column wherein the EG and THF were removed after separation from BDO which was refluxed back into the reactor. This resulted in the reaction mass called second mixture. The second mixture was not characterized and the reaction was continued as given below to form the third mixture.

Preparation of Third Mixture (At Pressures In the Range From 95 kPa To 50 kPa)

The second mixture was subjected to a pressure initially in the range of 95 to 80 kPa for a period of 10-40 min and more preferably 15-30 min. During this period, the temperature was controlled between 190 and 235° C. and more preferably between 190 and 220° C. and the vapors were subjected to distillation and much of the BDO of condensed vapors was refluxed back accompanied by the removal of EG, THF and minor amounts of BDO. At this stage, 80% of total EG present both as free and as bound was removed by distillation during transesterification. Subsequently, the pressure was reduced gradually to a range of 75 to 50 kPa and the temperature was maintained between 190 and 235° C. and more preferably between 190 and 220° C. The total time for transesterification was maintained between 30 to 150 min and preferably between 90 to 120 min. EG, THF and minor amount of BDO were removed by distillation and as before, much of the BDO was continuously refluxed back into the reactor. This resulted in the formation of a third mixture. The reaction conditions employed and the amounts of various ingredients collected in the distillate at the end of transesterification were as shown in Table 2.

TABLE 2

| Example | Pressure kPa | Temp °C. | Time min | THF Wt % | WATER Wt % | EG Wt % | BDO Wt % | QTY of OVHD g |
|---|---|---|---|---|---|---|---|---|
| 1 | Atm, 80, 50 | 191-219 | 65, 30, 30 | 14.38 | 7.18 | 56.36 | 22.08 | 8430 |

Recycling the BDO enabled a favorable BDO to EG ratio in the transesterification reactor and also improved productivity by lowering the transesterification time. EG was reused in the depolymerization step and BDO was reused in the transesterification step. The THF and water mixture were sent to storage vessels.

Polycondensation using the third mixture was carried out at a temperature ranging from 230 to 265° C. and preferably from 245 to 255° C. The pressure was gradually reduced to a level of 0.01 kPa to 1 kPa to enable molecular weight build-up. The reaction was conducted within a time span of 45 to 120 min and preferably 45 to 75 min. During polycondensation, excess BDO and residual EG were removed, along with THF and Water. The vapor byproducts were subjected to distillation to separate EG, BDO, THF and water mixture. The final polymer product (PBT) had a I.V. ranging from 0.5 to 1.5 dl/gm and EG content less than 0.5 wt. % each based on final polymer. Typically, the IPA content was less than 2% in the polymer. The melting point of the final polymer was in the range from 215 to 222° C. The experimental conditions used for polycondensation and the composition of the distillates were as shown in Table 3.

TABLE 3

| Example | Press kPA | Temp °C. | Time min | THF Wt % | Water Wt % | EG Wt % | BDO Wt % | Qty of overhead, g |
|---|---|---|---|---|---|---|---|---|
| 1 | 50-0.13 | 252 | 63 | 1.755 | 6.07 | 30.72 | 61.45 | 1634 |

The results produced a modified polybutylene terephthalate random copolymer containing residues from the polyethylene terephthalate. The modified polybutylene terephthalate was subjected to solid state polymerization.

Examples 2-5

Glass Filled Compositions

Glass filled compositions with the indicated amounts of ingredients were as shown in Table 4 were made and tested.

TABLE 4

| Component | Unit | Example 2 | Example 3 (Comparative) | Example 4 | Example 5 (Comparative) |
|---|---|---|---|---|---|
| PET Derived PBT, (0.66 iv) | wt. % | 16 | — | 35.52 | — |
| PET Derived PBT, (1.2 iv) | wt. % | 32.4 | — | 35.44 | — |
| GE VIRGIN PBT 195 (0.66 iv) | wt. % | — | 16 | — | 35.52 |
| GE VIRGIN PBT 315 (1.2 iv) | wt. % | — | 32.4 | — | 35.44 |

TABLE 4-continued

| Component | Unit | Example 2 | Example 3 (Comparative) | Example 4 | Example 5 (Comparative) |
|---|---|---|---|---|---|
| Standard 13 Micron Glass Fiber | wt. % | 30 | 30 | 30 | 30 |
| Polycarbonate 105, 100 Grade Powder | wt. % | 2 | 2 | — | — |
| High Flow Polycarbonate-Lexan ML8199-111N | wt. % | 18 | 18 | — | — |
| Hydrocarbon Wax Release | wt. % | 0.4 | 0.4 | — | — |
| Monosodium Phosphate, Anhydrous | wt. % | 0.2 | 0.2 | — | — |
| Hindered Phenol Stabilizer (Irganox 1010) | wt. % | 0.06 | 0.06 | 0.04 | 0.04 |
| Linear Low Density Polyethylene | wt. % | 1 | 1 | — | — |

The polycarbonate 105 (100 grade powder) and LEXAN ML8199-111N were both obtained from GE Plastics. The antioxidant was obtained from Ciba Geigy under the trade name IRGANOX® as IRGANOX® 1010. This antioxidant is a tetra functional 2, 6-di-tert butyl hindered phenol. The monosodium phosphate additive was obtained from Brenntag Chemicals. The hydrocarbon wax release additive is added as a mold release that was purchased from Honeywell. The linear low density polyethylene additive was purchased from Nova Chemicals. The glass fiber additive was a standard 13 micron glass fiber that was obtained from PPG Industries. PETS means pentaerythritol tetra stearate, a mold release which was purchased from FACI. SAPP represents sodium dihydrogen pyrophosphate and was obtained from Ulrich Chemicals Ltd. The talc is a commercial grade sold by Barretts. The alkane sodium sulfonate antistatic pellets are commercially sold by Clariant under the tradename Hostastat HS-3. The low iv fast crystallizing PET has an iv of 0.55 and was obtained from Invista Corp.

Preparation Procedures

Example 2

The ingredients of Example 2 shown above were extruded on a 89 mm Single Screw Extruder with a vacuum vented mixing screw, at a barrel and die head temperature between 240 and 265° C. and 150 to 300 rpm screw speed. The extruder has 8 independent feeders for different raws with a downstream feeder for glass and can be operated at a maximum rate of 600 lbs/hr (272.2 kg/hour). The extrudate was cooled through a water bath prior to pelletizing. Test parts were injection molded on a van Dorn molding machine with a set temperature of approximately 240 to 265° C. The pellets were dried for 3-4 hours at 120° C. in a forced air circulating oven prior to injection molding.

Example 3 (Comparative)

The procedure of Example 2 was followed, except that instead of the modified polybutylene terephthalate random copolymer derived from polyethylene terephthalate, the monomer based "virgin" PBT was used.

Example 4

For Example 4, the ingredients shown above in Table 4, were extruded on a 37 mm Toshiba TEM-37BS Twin Screw Extruder with a vacuum vented mixing screw, at a barrel and die head temperature between 240 and 265° C. and at a screw speed of 150 to 300 rpm. The extruder had 8 independent feeders for different raws and could be operated at a maximum rate of 200 lbs/hr (90.0 kg/hr). The extrudate was cooled through a water bath prior to pelletizing. Test parts were injection molded on NISSEI ES3000 (for ASTM bars) or FANUC S-2000i (for ISO bars) molding machines with a set temperature of approximately 240 to 265° C. The pellets were dried for 3-4 hours at 120° C. in a forced air circulating oven prior to injection molding.

Example 5 (Comparative)

The procedure of Example 4 was followed, except that instead of using the modified polybutylene terephthalate random copolymer derived from polyethylene, the monomer based "virgin" PBT was used.

Testing Procedures

Capillary viscosity, which is another indicator of melt-flow was measured by ASTM D3835 or ISO D11433. Dried pellets were extruded through a capillary Rheometer and the force at varied shear rates was determined to estimate the shear viscosity.

Tensile properties were tested at 23° C. according to ISO 527 on 150×10×4 mm (length×width×thickness) injection molded bars with a crosshead speed of 5 mm/min. Izod unnotched impact was measured at 23° C. with a pendulum of 5.5 Joule on 80×10×4 mm (length×width×thickness) impact bars according to ISO 180 method. Flexural properties or three point bending were measured at 23° C. on 80×10×4 mm (length×width×thickness) impact bars with a crosshead speed of 2 mm/min according to ISO 178.

In other cases, injection molded parts were tested by ASTM. Notched Izod testing as done on 3×½×⅛ inch (76.2× 12.7×3.2 mm) bars using ASTM method D256. Bars were notched prior to oven aging, samples were tested at room temperature. Tensile elongation at break was tested on 7×⅛ in. (177.8×3.3 mm) injection molded bars at room temperature with a crosshead speed of 2 in./min (50.8 mm/min) for glass filled samples and 0.2 in/min (5.08 mm/min) for unfilled samples by using ASTM D648. Flexural properties were measured using ASTM 790 or ISO 178 method. Biaxial impact testing, sometimes referred to as instrumented impact testing, was done as per ASTM D3763 using a 4×⅛ inch (101.6×3.2 mm) molded discs. The total energy absorbed by the sample is reported as ft-lbs or J. Testing was done at room temperature on as molded or oven aged samples. Heat Deflection Temperature was tested on five bars having the dimensions 5×0.5×0.125 inches (127×12.7×3.2 mm) using ASTM method D648.

A synopsis of all the relevant tests and test methods is given in Table 5

TABLE 5

| | Test Standard | Default Specimen Type | Units |
|---|---|---|---|
| ASTM Flexural Test | ASTM D790 | Bar - 127 × 12.7 × 3.2 mm | Mpa |
| ISO Flexural Test | ISO 178 | Multi-purpose ISO 3167 Type A | Mpa |
| ASTM HDT Test | ASTM D648 | Bar - 127 × 12.7 × 3.2 mm | ° C. |
| ISO HDT Test | ISO 75 | Bar - 80 × 10 × 4 mm | ° C. |
| ASTM HDT Test | ASTM D648 | Bar - 127 × 12.7 × 3.2 mm | ° C. |
| ISO HDT Test | ISO 75 | Multi-purpose ISO 3167 Type A | ° C. |
| ASTM Filled Tensile Test | ASTM D638 | ASTM Type I Tensile bar | Mpa |
| ISO Filled Tensile Test | ISO 527 | Multi-purpose ISO 3167 Type A | Mpa |
| ISO Izod at Room Temperature | ISO 180 | Multi-purpose ISO 3167 Type A | kJ/m$^2$ |
| ASTM Izod at Room Temperature | Notched ASTM D256 | Bar - 63.5 × 12.7 × 3.2 mm | J/m |
| ASTM Multiaxial Impact | ASTM D3763 | Disk - 101.6 mm dia × 3.2 mm thick | J |
| ISO Charpy Impact | ISO 179 | Bar - 80 × 10 × 4 mm | kJ/m$^2$ |
| ISO Density | ISO 1183 | Bar - 80 × 10 × 4 mm | g/cm$^3$ |
| Shrinkage | GEP Method | Disk - 101.6 mm dia × 3.2 mm thick | % |
| ISO Melt Volume Rate Test | ISO 1133 | Pellets | cm$^3$/10 min |
| ASTM Melt Flow Rate | ASTM D1238 | Pellets | g/10 min |
| ISO Vicat Softening Temp | ISO 306 | Bar - 80 × 10 × 4 mm | ° C. |
| ISO Coefficient of Thermal Expansion | ISO 11359-2 | Multi-purpose ISO 3167 Type A | um/(m-° C.) |

The following testing procedures were used.

Melt Volume Rate (MVR) on pellets (dried for 2 hours at 120° C. prior to measurement) was measured according to ISO 1133 method at dwelling time of 240 seconds and 0.0825 inch (2.1 mm) orifice.

Results/Discussion

Table 6 shows the physical properties obtained for Examples 2-5.

TABLE 6

| Test | Unit | Example 2 | Example 3 Comparative | Example 4 | Example 5 Comparative |
|---|---|---|---|---|---|
| Flexural Modulus (ASTM) | MPa | 8310 | 8170 | 7750 | 7740 |
| Flexural Modulus (ISO) | MPa | 8051 | 7182 | 8480.75 | 8483.8 |
| Deflection temp, 1.82 MPa (ASTM) | °C. | 133 | 146 | 206 | 212 |
| Deflection temp, Flat, 1.8 MPa (ISO) | °C. | 136 | 135 | — | — |
| Deflection temp, 0.455 MPa (ASTM) | °C. | 200 | 206 | 218 | 224 |
| Deflection temp, 0.456 MPa (ISO) | °C. | 198 | 206 | — | — |
| Tensile Modulus (ASTM) | MPa | 10500 | 8450 | 9534.2 | 9401.6 |
| Tensile Stress at Yield (ASTM) | MPa | 115 | 115 | — | — |
| Tensile Stress at Break (ASTM) | MPa | 115 | 115 | 123 | 124 |
| Tensile Elongation at Yield (ASTM) | % | 2.8 | 2.9 | — | — |
| Tensile Elongation at Break (ASTM) | % | 5 | 4 | 3.4 | 3.5 |
| Tensile Modulus (ISO) | MPa | 9565 | 9600 | 9137.6 | 8852.2 |
| Tensile Stress at Yield (ISO) | MPa | 117 | 117 | — | — |
| Tensile Stress at Break (ISO) | MPa | 117 | 117 | 125.09 | 126.51 |
| Tensile Strain at Yield (ISO) | % | 2.4 | 2.5 | — | — |
| Tensile Strain at Break (ISO) | % | 2 | 3 | 3.54 | 3.84 |
| Notched IZOD Impact Strength (ISO) | kJ/m$^2$ | 9 | 9 | — | — |
| Notched IZOD Impact Strength (ASTM) | J/m | 90 | 97 | 75.3 | 83.9 |
| Un-Notched IZOD Impact Strength (ASTM) | J/m | 816 | 850 | 716 | 789 |
| Multiaxial Impact Total Energy, 2.3 m/s, RT (ASTM) | J | 13 | 13 | — | — |
| Multiaxial Impact Total Energy, 2.3 m/s, −40 C. | J | 9 | 9 | — | — |
| Charpy Impact strength, RT (ISO) | kJ/m$^2$ | 12 | 13 | 8.08 | 8.28 |
| Density - ISO 1183 | g/cm$^3$ | 1.48 | 1.47 | — | — |
| Shrinkage Parallel, 120 C. | % | — | — | 0.48 | 0.46 |
| Shrinkage Perpendicular, 120 C. | % | — | — | 1.09 | 1.11 |
| MVR, 250 C., 2.16 Kg, 240 s (ISO) | cm$^3$/10 min | 7.1 | 6.2 | 38.47 | 27.91 |
| MFR, 250 C., 2.16 Kg, 360 s (ASTM) | g/10 min | 9.5 | 8.0 | — | — |
| Vicat Softening Temp, 50N, 120 C./hr (ISO) | °C. | 171 | 179 | — | — |
| CTE, Flow (ISO) | μm/(m-°C.) | 26 | 24 | 28.84 | 24.93 |

Surprisingly, it is seen from Table 6 that both the glass filled molding compositions show an enhancement in the flow when the virgin PBT is substituted by the modified PBT. The increase in flow as measured by the MVR of the system lies between 15 and 38% for the examples shown in Table 6. Example 2 is more energy efficient than Example 3. A savings of 14.7 MJ/kg is derived in making molding composition 2 versus 3. Similarly, example 4 is also more energy efficient compared to example 5. Example 5 requires an excess of 21.6 MJ/kg energy to produce versus Example 4.

Examples 6-7

In these examples, talc filled compositions were evaluated. Table 7 indicates which compositions were used.

TABLE 7

| Component | Unit | Example 6 | Example 7 (Comparative) |
|---|---|---|---|
| PET Derived PBT, (0.66 iv) | wt. % | 16 | — |
| PET Derived PBT, (1.2 iv) | wt. % | 32.4 | — |
| GE VIRGIN PBT 195 (0.66 iv) | wt. % | — | 16 |
| GE VIRGIN PBT 315 (1.2 iv) | wt. % | — | 32.4 |
| Talc | wt. % | 20 | 20 |
| Low-IV, Fast-Crystallizing PET | wt. % | 20 | 20 |
| Hindered Phenol Stabilizer | wt. % | 0.04 | 0.04 |
| SAPP-Technical-Food Grade | wt. % | 0.1 | 0.1 |
| Alkane SO3Na Antistatic Pellet | wt. % | 1 | 1 |
| Pentaerythritol Tetrastearate | wt. % | 0.2 | 0.2 |

The ingredients of Example 6 were extruded on a 89 mm Single Screw Extruder with a vacuum vented mixing screw, at a barrel and die head temperature between 240 and 265° C. and 150 to 300 rpm screw speed. The extruder had 8 independent feeders for different raws with a downstream feeder for glass and could be operated at a maximum rate of 600 lbs/hr (272.7 kg/hr). The extrudate was cooled through a water bath prior to pelletizing. Test parts were injection molded on a van Dom molding machine with a set temperature of approximately 240 to 265° C. The pellets were dried for 3-4 hours at 120° C. in a forced air circulating oven prior to injection molding.

Example 7 (Comparative)

The procedure of Example 6 was followed, except that virgin PBT was used.

Testing Procedures

The compositions were subjected to testing in accordance to the testing procedures used in Examples 2-5. The properties obtained from the talc filled composition were as shown in Table 8.

TABLE 8

| Test | Unit | Example 6 | Example 7 (Comparative) |
|---|---|---|---|
| Flexural Modulus (ASTM) | Mpa | 4610 | 4520 |
| Flexural Modulus (ISO) | MPa | 4670.6 | 4582.8 |
| Deflection temp, 1.82 MPa (ASTM) | °C. | 76 | 80 |
| Deflection temp, Flat, 1.8 MPa (ISO) | °C. | 74 | 74 |
| Deflection temp, 0.455 MPa (ASTM) | °C. | 182 | 188 |
| Deflection temp, 0.456 MPa (ISO) | °C. | 167 | 174 |
| Tensile Modulus (ASTM) | MPa | 4610 | 4040 |
| Tensile Stress at Yield (ASTM) | MPa | 55 | 57 |
| Tensile Stress at Break (ASTM) | MPa | 55 | 57 |
| Tensile Elongation at Yield (ASTM) | % | 2.2 | 2.5 |
| Tensile Elongation at Break (ASTM) | % | 2 | 3 |
| Tensile Modulus (ISO) | MPa | 4362 | 4281 |
| Tensile Stress at Yield (ISO) | MPa | 52 | 55 |
| Tensile Stress at Break (ISO) | MPa | 52 | 55 |
| Tensile Strain at Yield (ISO) | % | 1.9 | 2.2 |
| Tensile Strain at Break (ISO) | % | 2 | 2 |
| Notched IZOD Impact Strength (ISO) | kJ/m$^2$ | 3 | 3 |
| Notched IZOD Impact Strength (ASTM) | J/m | 36 | 32 |
| Un-Notched IZOD Impact Strength (ASTM) | J/m | 346 | 373 |
| Multiaxial Impact Total Energy, 2.3 m/s, RT (ASTM) | J | 5 | 5 |
| Multiaxial Impact Total Energy, 2.3 m/s, −40 C. (ASTM) | J | 4 | 5 |
| Charpy Impact strength, RT (ISO) | KJ/m$^2$ | 8 | 9 |
| Density-ISO 1183 | g/cm$^3$ | 1.46 | 1.46 |
| Shrinkage Parallel, 120 C. | % | 1.85 | 1.96 |
| Shrinkage Perpendicular, 120 C. | % | 2.16 | 2.26 |
| MVR, 250 C., 2.16 Kg, 240 s (ISO) | cm$^3$/10 min | 72 | 49 |
| MFR, 250 C., 2.16 Kg, 360 s (ASTM) | g/10 min | 102 | 67 |
| Vicat Softening Temp, 50N, 120 C./hr (ISO) | °C. | 173 | 183 |
| CTE, Flow (ISO) | μm/(m-°C.) | 47.9 | 47.7 |
| CTE, cross Flow (ISO) | μm/(m-°C.) | 90.9 | 91.4 |

It is interesting to note that even with a mineral filler such as talc, the enhancement in flow of a molding composition containing modified PBT remains. In the case of the talc filled molding composition shown above, an increase of 47% in the melt volume rate (MVR) was observed. Such an increase in the MVR can improve the flow and can reduce the cycle times and injection pressures for making articles.

Example 6 is more energy efficient than Example 7. A savings of 14.7 MJ/kg is derived in making molding composition 6 versus 7.

Examples 8-9

In these examples, glass filled compositions with flame retardants were evaluated. Table 9 indicates which compositions were used.

TABLE 9

| Description | Unit | Example 8 | Example 9 (Comparative) |
|---|---|---|---|
| PET Derived PBT (0.66 iv) | % | 35 | — |
| PET Derived PBT (1.2 iv) | % | 8.35 | — |
| GE PBT 195 (0.66 iv) | % | — | 35 |
| GE PBT 315 (1.2 iv) | % | — | 8.35 |
| Brominated Epoxy | % | — | — |
| Chopped 13 Micron Glass Fiber | % | 33 | 33 |
| Sb$_2$O$_3$/PE Concentrate (80/20) | % | 3.5 | 3.5 |
| Phosphite 168 | % | 0.05 | 0.05 |
| Pentaerythritol Tetrastearate | % | — | — |
| Sodium Stearate | % | — | — |
| Impact Modifier (Lotader AX8900) | % | — | — |
| Antioxidant 60 | % | — | — |
| PBT-PTHF Elastomer (Hytrel 4056) | % | — | — |
| Poly(Ethylene-stat-Glycidylmethacrylate)-grafted-polyMethylMethAcrylate-EGME-g-MMA(60/10/30) | % | 5 | 5 |
| Styrene Ethylene Butylene Styrene Block Copolymer - S(EB)S Rubber 1651 | % | 5 | 5 |
| Antioxidant 50 | % | 0.1 | 0.1 |
| Pentaerythrytol tetrakis (3-laurylthiodipropionate) - PELTP | % | 0.2 | 0.2 |
| TSAN | % | 0.1 | 0.1 |
| Brominated Bisphenol A-diglycidyl ether copolymer (SR-T48) | % | 9.5 | 9.5 |
| Sodium Acid PyroPhosphate (SAPP) | % | 0.2 | 0.2 |

Testing Procedures

Example 8

The ingredients were tumble-blended and then extruded on line PT-4, which is a 44 mm JSW Tex-44 Twin Screw Extruder with a vacuum vented mixing screw. The temperature at the barrel and die head was set between 250° C. and 265° C. at a screw speed of 200 rpm. The extruder had 4 independent feeders for different raws and could be operated at a maximum rate of 200 kg/hr. The extrudate was cooled through a water bath prior to pelletizing. Test parts were injection molded on a TIG280 molding machine with a set temperature of approximately 240° C. to 265° C. The pellets were dried for 3-4 hours at 120° C. in a forced air-circulating oven prior to injection molding. Abusive molding was done on the same TIG280 molding machine with a set temperature of approximately 240° C. to 265° C. Pellet drying conditions were the same as the normal molding conditions (as mentioned above).

Molded Parts

The machine parameters were optimized for a given thickness and then parts were molded under the normal conditions (as mentioned above).

Example 9 (Comparative)

For Example 9, the procedure of Example 8 was followed except that virgin PBT was used. The properties of glass filled flame retardant compositions are shown in Table 10.

TABLE 10

| Test | Unit | Example 8 | Example 9 (Comparative) |
|---|---|---|---|
| Flexural Modulus (ASTM) | MPa | 7994.205 | 7926.225 |
| Flexural Modulus (ISO) | MPa | 8839.8 | 8755.8 |
| Deflection temp, 1.82 MPa (ASTM) | °C. | 201.33 | 206.265 |

TABLE 10-continued

| Test | Unit | Example 8 | Example 9 (Comparative) |
|---|---|---|---|
| Deflection temp, Flat, 1.8 MPa (ISO) | °C. | 197 | 201 |
| Tensile Stress at Break (ASTM) | MPa | 109.5 | 108.9 |
| Tensile Elongation at Break (ASTM) | % | 11 | 11 |
| Tensile Modulus (ISO) | MPa | 8228.2 | 8216 |
| Tensile Stress at Break (ISO) | MPa | 109.25 | 111.2 |
| Tensile Strain at Break (ISO) | % | 3.8 | 4 |
| Notched IZOD Impact Strength (ASTM) | J/m | 12.84+ | 13.48+ |
| Charpy Impact strength, RT (ISO) | KJ/m² | 11.925 | 13.025 |
| Density - ASTM D792 | g/cm³ | 1.57 | 1.57 |
| Shrinkage Parallel, 120 C. | % | 0.13++ | 0.17++ |
| Shrinkage Perpendicular, 120 C. | % | 0.67++ | 0.73++ |
| MVR, 250 C., 2.16 Kg, 240 s (ISO) | cm³/10 min | 7.3 | 4.1 |
| MFR, 250 C., 2.16 Kg, 360 s (ASTM) | g/10 min | 11.5+++ | 6.5+++ |

+measured in KJ/m²
++measured at 50 C.
+++measured at 250 C. and 5 kgf

Examples 9 and 8 showed the same trend in the flow enhancement as the previous examples. A 77% increase in the MVR was observed for example 8 compared to the comparative example 9.

Example 8 is more energy efficient than Example 9. A savings of 13.2 MJ/kg is realized in making molding composition 8 versus 9.

Examples 10-19

Experiments were carried out with different ratios of low iv and high iv samples of modified PBT random copolymers containing residues derived from PET. The corresponding comparatives were also prepared by using respective ratios of virgin PBT resin samples Example 10-19

The ingredients of the examples shown below in Table 11, were extruded on a 64 mm Single Screw Extruder with a vacuum vented mixing screw, at a barrel and die head temperature between 240 and 265° C. and 150 to 300 rpm screw speed. The extruder has 1 feeder to feed the blend and can be operated at a maximum rate of 100 lbs/hr (45 kg/hr). The extrudate was cooled through a water bath prior to pelletizing. Test parts were injection molded on a van Dom molding machine with a set temperature of approximately 240 to 265° C. The pellets were dried for 3-4 hours at 120° C. in a forced air circulating oven prior to injection molding.

TABLE 11

| | | Example | | | | | | | | | |
|---|---|---|---|---|---|---|---|---|---|---|---|
| | Unit | 10 | 11 Comp. | 12 | 13 Comp. | 14 | 15 Comp. | 16 | 17 Comp. | 18 | 19 Comp. |
| PET Derived PBT, (0.66 iv) | % | 0.00 | — | 17.44 | — | 34.88 | — | 52.31 | — | 69.75 | — |
| PET Derived PBT, (1.2 iv) | % | 69.75 | — | 52.31 | — | 34.88 | — | 17.44 | — | 0.00 | — |
| GE "Virgin" PBT 195 (0.66 iv) | % | — | 0.00 | — | 17.44 | — | 34.88 | — | 52.31 | — | 69.75 |
| GE "Virgin" PBT 315 (0.66 iv) | % | — | 69.75 | — | 52.31 | — | 34.88 | — | 17.44 | — | 0.00 |
| Standard 13 Micron Glass Fiber | % | 30 | 30 | 30 | 30 | 30 | 30 | 30 | 30 | 30 | 30 |
| Hindered Phenol Stabilizer (Irganox 1010) | % | 0.05 | 0.05 | 0.05 | 0.05 | 0.05 | 0.05 | 0.05 | 0.05 | 0.05 | 0.05 |
| Pentaerythritol Tetrastearate | % | 0.2 | 0.2 | 0.2 | 0.2 | 0.2 | 0.2 | 0.2 | 0.2 | 0.2 | 0.2 |

The properties of the glass filled compositions given in Table 11 are shown in the Table 12.

TABLE 12

| | | Examples | | | | | | | | | |
|---|---|---|---|---|---|---|---|---|---|---|---|
| Test | Unit | 10 | 11 Comp. | 12 | 13 Comp. | 14 | 15 Comp. | 16 | 17 Comp. | 18 | 19 Comp. |
| Flexural Modulus (ASTM) | MPa | 8420 | 7400 | 9530 | 7410 | 7740 | 7860 | 7790 | 7920 | 6980 | 7120 |

TABLE 12-continued

| Test | Unit | 10 | 11 Comp. | 12 | 13 Comp. | 14 | 15 Comp. | 16 | 17 Comp. | 18 | 19 Comp. |
|---|---|---|---|---|---|---|---|---|---|---|---|
| Deflection temp, 1.82 MPa (ASTM) | °C. | 200 | 199 | 199 | 203 | 190 | 202 | 193 | 200 | 188 | 189 |
| Deflection temp, 0.455 MPa (ASTM) | °C. | 217 | 214 | 216 | 221 | 210 | 221 | 213 | 221 | 212 | 218 |
| Tensile Modulus (ASTM) | MPa | 10100 | 10900 | 12800 | 10800 | 10100 | 11400 | 10700 | 11100 | 9070 | 10300 |
| Tensile Stress at Yield (ASTM) | MPa | 112 | 110 | 116 | 107 | 108 | 109 | 107 | 106 | 98.8 | 99.4 |
| Tensile Stress at Break (ASTM) | MPa | 112 | 110 | 117 | 107 | 108 | 109 | 107 | 106 | 98.7 | 99.2 |
| Tensile Elongation at Yield (ASTM) | % | 2 | 2.1 | 1.9 | 2.2 | 2.5 | 2.4 | 2.5 | 2.5 | 2.9 | 2.9 |
| Tensile Elongation at Break (ASTM) | % | 2 | 2.1 | 1.9 | 2.2 | 2.5 | 2.4 | 2.6 | 2.5 | 3.1 | 3.3 |
| Notched IZOD Impact Strength (ASTM) at Room Temperature | J/m | 79.8 | 80.5 | 89.4 | 74.3 | 78.8 | 79.2 | 89.6 | 87.1 | 99 | 94 |
| Notched IZOD Impact Strength (ASTM) at −30 C. | J/m | 78.2 | 71.6 | 84.8 | 68.9 | 73.4 | 70.2 | 76.7 | 58.4 | 71.4 | 69.3 |
| Multiaxial Impact Total Energy, 2.3 m/s, RT (ASTM) | J | 7.04 | 7.46 | 8.28 | 6.74 | 8.22 | 9.1 | 10.1 | 11.4 | 12.4 | 12.2 |
| MVR, 250 C., 2.16 Kg, 240 s (ISO) | cm³/10 min | 39 | 20.79 | 23.9 | 23.9 | 18.54 | 12.36 | 13.06 | 8.31 | 6.31 | 5.51 |
| Capillary Viscosity @ 24/s | Pa-s | 358.7 | 731.8 | 387.4 | 545.2 | 387.4 | 789.1 | 890 | 1047.4 | 1148 | 1980 |
| Capillary Viscosity @ 664/s | Pa-s | 175.4 | 283.7 | 211.7 | 238.2 | 246.9 | 357.4 | 353 | 472.1 | 517 | 629.7 |
| Capillary Viscosity @ 1520/s | Pa-s | 132.5 | 197.2 | 157.3 | 163.2 | 173.6 | 244.7 | 249 | 328.5 | 349 | 421.5 |
| Capillary Viscosity @ 2286/s | Pa-s | 114.5 | 166.5 | 134.3 | 143.6 | 148.5 | 210.5 | 209 | 272.3 | 285 | 336.7 |
| Capillary Viscosity @ 5886/s | Pa-s | 76.4 | 101.7 | 84.1 | 90.7 | 93.6 | 129.8 | 128 | 163.9 | 165 | 215.4 |

The data shown in the Table 12 was also plotted graphically (FIG. 1) to understand the behavior of the molding compositions over different PBT ratios.

FIG. 1 shows capillary Viscosity at 1520/s versus Ratio of Low iv PBT to (Low iv PBT+High iv PBT) in the Molding Composition. Interestingly, the data from FIG. 1 shows that over the entire range of PBT ratios in the molding composition, the modified PBT composition consistently displays a viscosity that is lower than the virgin PBT composition. The average difference in the capillary viscosities (at 1520/s) of the 2 sets of compositions is approximately 46 Pa-s.

Figure 2:
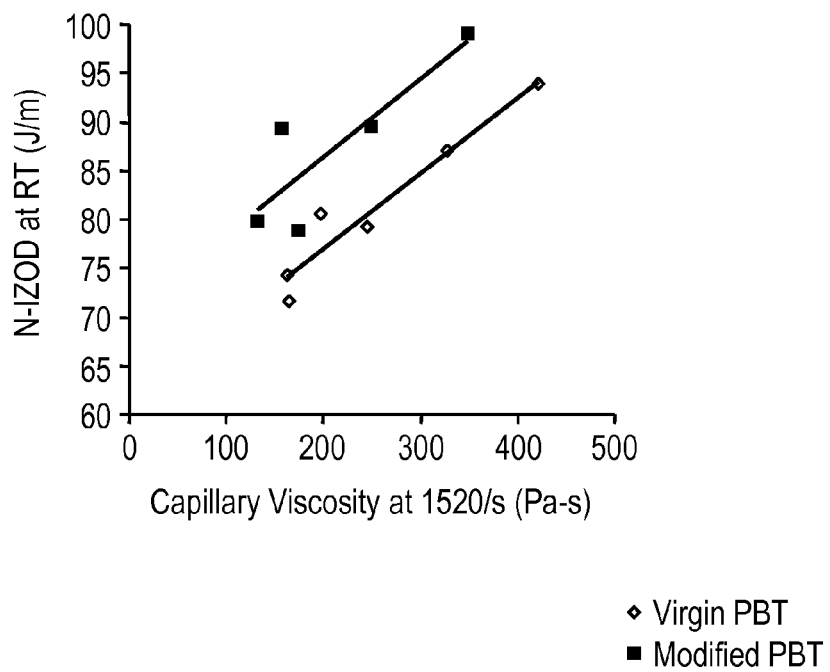
FIG. 2 shows Notched Izod Impact Strength (at room temperature) versus the Capillary Viscosity (at 1520/s) measured for Glass Filled Virgin PBT and Modified PBT Compositions

FIG. 2 shows the trend of the notched izod impact strength that was obtained for various glass filled molding compositions (containing different ratios of low iv and high iv PBT) versus the capillary viscosity at 1520/s for the glass filled virgin PBT and modified PBT compositions. The surprising observation for the dataset is that the modified PBT composition of the same value of notched izod impact strength displays a lower viscosity than the regular PBT composition. This is a highly advantageous property of the modified PBT molding composition since it offers a flow advantage while offering the same impact strength.

Examples 20-26

Experiments were carried out with small quantity of additives to increase the heat deflection temperature of 'PET derived PBT' compositions.

Example 20-25 And Comparative Example 26

The ingredients of the examples shown in Table 13, were extruded on a 64 mm Single Screw Extruder with a vacuum vented mixing screw, at a barrel and die head temperature between 240 and 265° C. and 150 to 300 rpm screw speed. The extruder had 1 feeder to feed the blend and can be operated at a maximum rate of 100 lbs/hr (45 kg/hr). The extrudate was cooled through a water bath prior to pelletizing. Test parts were injection molded on a van Dom molding machine with a set temperature of approximately 240 to 265° C. The pellets were dried for 3-4 hours at 120° C. in a forced air circulating oven prior to injection molding. Table 13 shows relevant details.

TABLE 13

| | | Examples | | | | | | |
|---|---|---|---|---|---|---|---|---|
| Component | Unit | 20 | 21 | 22 | 23 | 24 | 25 | 26 (comparative) |
| GE PBT 195 (0.66 iv) | wt. % | — | — | — | — | — | — | 35 |
| GE PBT 315 (1.2 iv) | wt. % | — | — | — | — | — | — | 35 |
| PET Derived PBT (0.66 iv) | wt. % | 33 | 34 | 35 | 35 | 34 | 35 | — |
| PET Derived PBT (1.2 iv) | wt. % | 33 | 34 | 35 | 35 | 34 | 35 | — |
| STANDARD 13 MICRON PBT GLASS | wt. % | 30 | 30 | 30 | 30 | 30 | 30 | 30 |
| Ultratalc: Talc with an average particle size at less than 0.9 um | wt. % | — | — | 0.20 | 0.50 | 1.50 | — | — |
| TSAN (50 wt. % poly(tetrafluoro ethylene) encapsulated with poly(styrene-co-acrylonitrile)) | wt. % | — | 1.00 | — | — | — | — | — |
| 85% Antimony oxide ($Sb_2O_3$) concentrate in Ethylene vinyl acetate, with average particle size of 1.25 um | wt. % | 4.00 | — | — | — | — | — | — |
| Pentaerythritol Tetrastearate | wt. % | 0.20 | 0.20 | 0.20 | 0.20 | 0.20 | 0.20 | 0.20 |
| Hindered Phenol Stabilizer (Irganox 1010) | wt. % | 0.05 | 0.05 | 0.05 | 0.05 | 0.05 | 0.05 | 0.05 |

Testing Procedures

The compositions were subjected to testing in accordance to the testing procedures used in Examples 2-5. The properties obtained from the filled composition with various additives are as shown in Table 14.

TABLE 14

| | | Examples | | | | | | |
|---|---|---|---|---|---|---|---|---|
| Test | Unit | 20 | 21 | 22 | 23 | 24 | 25 | 26 (comparative) |
| Heat Deflection temp, 1.82 MPa (ASTM) | ° C. | 197 | 200 | 200 | 199 | 199 | 190 | 202 |
| Heat Deflection temp, 0.455 MPa (ASTM) | ° C. | 214 | 215 | 217 | 215 | 215 | 210 | 221 |
| Flexural Modulus (ASTM) | MPa | 7730 | 8260 | 7740 | 7710 | 7810 | 7740 | 7860 |
| Tensile Modulus (ASTM) | MPa | 11100 | 11800 | 10900 | 13400 | 10400 | 10100 | 11400 |
| Tensile Stress at Yield (ASTM) | MPa | 105 | 116 | 111 | 111 | 110 | 108 | 109 |
| Tensile Stress at Break (ASTM) | MPa | 105 | 116 | 111 | 111 | 110 | 108 | 109 |
| Tensile Elongation at Yield (ASTM) | % | 2.4 | 2.6 | 2.5 | 2.5 | 2.6 | 2.5 | 2.4 |
| Tensile Elongation at Break (ASTM) | % | 2.4 | 2.6 | 2.5 | 2.5 | 2.6 | 2.5 | 2.4 |
| Notched IZOD Impact Strength (ASTM) at Room Temperature | J/m | 79 | 77 | 70 | 74 | 72 | 79 | 79 |
| Notched IZOD Impact Strength (ASTM) at −30 C. | J/m | 67 | 68 | 64 | 67 | 62 | 73 | 70 |

TABLE 14-continued

| Test | Unit | Examples | | | | | | |
|---|---|---|---|---|---|---|---|---|
| | | 20 | 21 | 22 | 23 | 24 | 25 | 26 (comparative) |
| Multiaxial Impact Total Energy, 2.3 m/s, RT (ASTM) | J | 8 | 8 | 10 | 9 | 8 | 8 | 9 |
| MVR, 250 C., 2.16 Kg, 240 s (ISO) | cm³/10 min | 20.6 | 11.1 | 16.4 | 17.1 | 14.6 | 18.5 | 12.4 |
| Capillary Viscosity @24/s at 250° C. | Pa-s | 603 | 674 | 574 | 502 | 674 | 387 | 789 |
| Capillary Viscosity @ 664/s | Pa-s | 290 | 304 | 276 | 285 | 317 | 247 | 357 |
| Capillary Viscosity @ 1520/s | Pa-s | 204 | 207 | 202 | 195 | 224 | 174 | 245 |
| Capillary Viscosity @ 2286/s | Pa-s | 177 | 178 | 163 | 171 | 189 | 149 | 211 |
| Capillary Viscosity @ 5886/s | Pa-s | 110 | 113 | 106 | 106 | 115 | 94 | 130 |

The comparison between Examples 25 and 26 without any nucleating additives, shows that heat deflection temperature (HDT) of glass-filled composition with 'PET drived PBT' was about 10° C. lower than that with virgin PBT.

Examples 20-24 in Table 12 demonstrate a method to increase the HDT by adding a small quantity of additives. Especially, a small quantity of inorganic fillers were added to the composition with 'PET derived PBT' as shown in Examples 20 and 22-24.

In Examples 22-24, a small quantity of ULTRATALC talc additive with average particle size at less than 0.9 micrometer substantially increased the HDT of the 'PET derived PBT' composition. Another inorganic compound, antimony oxide ($Sb_2O_3$) with a particle size of 1.25 μm was also found to be effective additive to increase the HDT as shown in example 20. Inorganic fillers with large surface area may accelerate the nucleation rate of 'PET drived PBT' to enhance the HDT. It was also found that a polymeric material could be used to increase the HDT of 'PET drived PBT'. Poly(tetrafluoro ethylene) in example 20 increased the HDT and also improved some physical properties such as modulus and tensile strength.

Examples 27-31 Compositions of Different PET Derived PBT Comonomer Loadings

Purpose—The purpose of these experiments were to produce a PET derived PBT copolymer with different amounts of comonomer loadings. It is known that the materials having a melting point greater than 200° C. exhibit useful engineering thermoplastic type properties. Thus, all the examples below show that useful PET derived PBT copolymers (melting point greater than 200° C.) can be synthesized. The process to produce these materials is shown below (Pilot Plant Process). Examples 27-31 used the recipes as indicated in Table 15.

TABLE 15

| | | Raw material amount details used for Examples 27-31 (PET derived PBT) | | | | | |
|---|---|---|---|---|---|---|---|
| Item | Parameter | Unit | 27 | 28 | 29 | 30 | 31 |
| Raws | Polyester Type | | Recycled PET | Recycled PET | Recycled PET | Recycled PET | Recycled PET |
| | PET Weight | Kgs | 11.4 | 11.4 | 11.4 | 11.6 | 11.6 |
| | BDO Weight | Kgs | 15.9 | 16.8 | 16.8 | 16.8 | 16.8 |
| | IPA Weight | Kgs | 0.0 | 0.0 | 0.0 | 0.52 | 1.04 |
| | DEG Weight | Kgs | 0.0 | 0.31 | 0.63 | 0.0 | 0.0 |
| | TPT as Ti Element | | 59 | 56 | 56.5 | 52.5 | 50 |

A modified polybutylene terephthalate random copolymer was derived from a polyethylene terephthalate component at larger scale in a helicone reactor. The helicone reactor had a capacity of 40 liters and was equipped with a special design of twin opposing helical blades with 270 degree twist; constructed of 316 SS with 16 g polish finish. The blade speed could be varied from 1 to 65 rpm. The agitators were connected 10 to a 7.5 HP Constant Torque Inverter Duty Motor which operates at 230/460 VAC, 3 PH and 60 Hz. These agitators provided excellent surface area for the polymer melt in order to build molecular weight. The helicone was also designed with an overhead condenser to condense the vapors in the glycolysis, transesterification (if any) and polymerization stages.

25 lbs (11.4 kgs) of recycle PET pellets with 35 lbs (15.9 kgs) of butanediol (molar ratio 2.9:1) were charged to the helicone reactor. 4.6 ml (100 ppm as Ti) of TPT catalyst were also added to the reaction mix. The temperature of the heating oil (for the helicone) was set to 250 C. The agitator speed was set at 67% of maximum. The butanediol was refluxed into the reactor for 2 hours. It should be noted that the design of the overhead condenser system did not allow a complete reflux of the butanediol. As a result, about 5 lbs (2.3 kgs) to 10 lbs (4.5 kgs) of butanediol evolved in the initial stages could not be refluxed. The butanediol evolved after that could be completely refluxed into the reactor.

For the polymerization stage (also referred to in this draft as 'poly stage'), a vacuum was applied to the helicone reactor and the reflux of butanediol to the reactor was discontinued. The speed of the agitator was set to 60% of max and the target amps of the motor were 3.5 amps. The logic for changes in agitator speed as the molecular weight of the polymer built up is shown in Table 3. The system pressure was brought down to 0.5 Torr (0.066 kPa) by the vacuum blower. The reaction was carried out until the polymer mass reached its $3^{rd}$ build. The reaction was stopped after 15 minutes into the $3^{rd}$ build and the polymer was cast in blobs. The products were then allowed to dry and ground into pellets. The following tests were conducted on the polymer sample:, iv measurement, NMR analysis and DSC analysis. These results can be seen in Table 16.

twin-screw extruder. This extruder is fitted with 9 barrel sections (L/D=29) and 2 feeders for introducing raw materials to the feed throat. Typically the materials were fed to the extruder at a rate between 30 lbs (13.6 kgs) and 60 lbs (27.3 kgs) per hour. The screw speed is typically adjusted to a value between 300 and 500 RPM. To minimize the specific energy and residence time of the material, the exact combination of feed rate and screw speed are selected to produce high feed rate and high torque. Compounded pellets were dried for 3-4 hours at 250° F. (121° C.) in an air-circulating oven prior to molding. A van Dorn injection-molding machine was used with following temperature profile (rear to front): 554° F. (290° C.), 570° F. (299° C.), 570° F. (299° C.), 590° F. (310° C.). Typical settings were as follows: 100 rpm screw speed,

TABLE 16

Differential scanning calorimetry (DSC), Intrinsic viscosity (IV) and composition data by NMR of the Examples 27-31

| Item | Parameter | Unit | Example 27 | Example 28 | Example 29 | Example 30 | Example 31 |
|---|---|---|---|---|---|---|---|
| DSC Data | Melting Point | (° C.) | 220.11 | 216.3 | 218.1 | 210.93 | 203.09 |
| | Crystallization Temp | (° C.) | 163.44 | 150.1 | 159.4 | 149.91 | 139.68 |
| | DH fusion | (° C.) | 26.41 | 27.1 | 26.5 | 24.79 | 23.65 |
| | DH crystallization | (kJ/kg) | 41.60 | 39.9 | 37.7 | 38.73 | 33.36 |
| Intrinsic Viscosity | IV | Dl/g | | 1.1 | 1.1 | 1.1 | 1.2 |
| Composition by NMR analysis | EG Repeat Unit | mol % | 1.7 | 3.0 | 3.2 | 2.8 | 2.9 |
| | DEG Repeat Unit | mol % | .2 | 0.4 | 0.3 | .2 | .2 |
| | BDO Repeat Unit | mol % | 47.9 | 47.4 | 47.3 | 47.5 | 47.4 |
| | Isophthalic Repeat Unit | mol % | 1.1 | 1.0 | 1.0 | 3.4 | 5.5 |
| | Terephthalic Repeat Unit | mol % | 49.0 | 48.1 | 48.1 | 46.2 | 44.1 |
| | Total Comonomers | mol % | 3.0 | 4.4 | 4.5 | 6.4 | 8.6 |
| | Total Comonomer Equivalents | ** | 6.0 | 8.8 | 9.0 | 12.8 | 17.2 |

** Residual Equivalents relative to the total of 100 equivalents of diol and 100 equivalents of diacid groups Examples 32-36 were synthesized using resins from Examples 27-31 respectively. The formulation for Examples 32-36 is shown below in Table 17.

Example 32-36

The ingredients of the examples shown below in Tables 17, were extruded on a Second Generation 30 mm co-rotating 600 psi (421,800 kg/m$^2$) hold pressure, 75 psi (52,725 kg/m$^2$) back pressure, and 30 sec cycle times. Temperatures at the front of the barrel and hold/back pressures were adjusted to accommodate differences in the processability between formulations. All standard parts were 0.125" (3.12 mm) thick.

TABLE 17

Glass Filled Compositions for Examples 32-36

| Component | Unit | Example 32 | Example 33 | Example 34 | Example 35 | Example 36 |
|---|---|---|---|---|---|---|
| PET Derived PBT(with different comonomer contents) | % | 43.69 | 43.69 | 43.69 | 43.69 | 43.69 |
| Low Density Polyethylene | % | 1.0 | 1.0 | 1.0 | 1.0 | 1.0 |
| Glass Fiber | % | 30.0 | 30.0 | 30.0 | 30.0 | 30.0 |
| Brominated Epoxy | % | 16.0 | 16.0 | 16.0 | 16.0 | 16.0 |
| IRGAPHOS 168 | % | 0.05 | 0.05 | 0.05 | 0.05 | 0.05 |
| PETS | % | 0.10 | 0.10 | 0.10 | 0.10 | 0.10 |
| NaST | % | 0.10 | 0.10 | 0.10 | 0.10 | 0.10 |
| Lotader AX8900 | % | 3.0 | 3.0 | 3.0 | 3.0 | 3.0 |

TABLE 17-continued

Glass Filled Compositions for Examples 32-36

| Component | Unit | Example 32 | Example 33 | Example 34 | Example 35 | Example 36 |
|---|---|---|---|---|---|---|
| Antioxidant 60 | % | 0.06 | 0.06 | 0.06 | 0.06 | 0.06 |
| Hytrel 4056 as F121 | % | 3.0 | 3.0 | 3.0 | 3.0 | 3.0 |

The properties of the molding compositions shown in Table 17 are tabulated below in Table 18.

TABLE 18

Physical Property data for Examples 32-36

| Test | Unit | Example 32 | Example 33 | Example 34 | Example 35 | Example 36 |
|---|---|---|---|---|---|---|
| Heat Deflection temp, 0.455 Mpa (ASTM) | ° C. | 203.1 | 197.9 | 201.6 | 192.1 | 183.4 |
| Heat Deflection temp, 1.82 Mpa (ASTM) | ° C. | 175.5 | 161.5 | 177 | 158.2 | 149.8 |
| Tensile Modulus (ASTM) | MPa | 10600 | 10400 | 10500 | 10100 | 10700 |
| Tensile Stress at Yield (ASTM) | MPa | 108 | 101 | 107 | 104 | 104 |
| Tensile Stress at Break (ASTM) | MPa | 108 | 101 | 107 | 104 | 104 |
| Tensile Elongation at Yield (ASTM) | % | 2.6 | 2.7 | 2.7 | 2.8 | 2.7 |
| Tensile Elongation at Break (ASTM) | % | 2.9 | 3.1 | 2.9 | 3.3 | 3.3 |
| Unnotched IZOD Impact Strength (ASTM), at 23° C. | J/m | 890 | 873 | 907 | 899 | 913 |
| Flex Modulus (ASTM) | MPa | 8090 | 7740 | 8170 | 7840 | 7960 |
| Flex Stress @ 5% Strain (ASTM) | MPa | 174 | 167 | 177 | 172 | 174 |
| Flex Stress @ Yield (ASTM) | MPa | 174 | 167 | 177 | 172 | 174 |
| MVR, 250 C., 5 Kg, 360 s (ASTM) | Cm$^3$/10 min | .549 | .792 | 2.61 | 2.42 | 158 |
| EG Repeat Unit | mol % | 1.7 | 3.0 | 3.2 | 2.8 | 2.9 |
| DEG Repeat Unit | mol % | .2 | 0.4 | 0.3 | .2 | .2 |
| BDO Repeat Unit | mol % | 47.9 | 47.4 | 47.3 | 47.5 | 47.4 |
| Isophthalic Repeat Unit | mol % | 1.1 | 1.0 | 1.0 | 3.4 | 5.5 |
| Terephthalic Repeat Unit | mol % | 49.0 | 48.1 | 48.1 | 46.2 | 44.1 |
| Total Comonomers | mol % | 3.0 | 4.4 | 4.5 | 6.4 | 8.6 |
| Total Residual Equivalents | ** | 6.0 | 8.8 | 9.0 | 12.8 | 17.2 |

** Residual Equivalents relative to the total of 100 equivalents of diol and 100 equivalents of diacid groups It is known for commercial reasons, molding compositions having HDT (at 0.455 MPa) greater than 180° C. are useful. A molding composition as shown in Example 36 was made using PET derived PBT having a total comonomer content at 17.2 equivalents of a residue selected from the group of isophthalic acid groups, ethylene glycol groups, and diethylene glycol groups, and combinations thereof, relative to the total of 100 equivalents of diol and 100 equivalents of diacid groups in the modified polybutylene terephthalate random copolymer. The HDT (at 0.455 MPa) value for this composition was observed to be 183.4° C. It is also interesting to note that the tensile modulus for all examples shown in Table 18 have approximately the same value. This proves that having a higher comonomer content in the PET derived PBT has minimal impact on tensile modulus of the molding compositions.

Although the present invention has been described in detail with reference to certain preferred versions thereof, other variations are possible. Therefore, the spirit and scope of the appended claims should not be limited to the description of the versions contained therein.

What is claimed is:
1. A composition comprising:
(a) from 5 to 99 wt. % of a modified polybutylene terephthalate random copolymer that (1) is derived from polyethylene terephthalate copolymers comprising a mixture of ethylene glycol groups, diethylene glycol groups, terephthalic acid groups, and isophthalic acid groups, and 1,4-butanediol, and (2) comprises a mixture of 1,4-butanediol groups, ethylene glycol groups, diethylene glycol groups, terephthalic acid groups, and isophthalic acid groups, and

(b) a filler component;

wherein the ethylene glycol groups and diethylene glycol groups are each present in an amount ranging from 0.1 to 10 mole %, based on 100 mole % of glycol in the modified polybutylene terephthalate random copolymer;

wherein the isophthalic acid groups are present in an amount ranging from 0.1 to 10 mole %, based on 100 mole % of diacid in the modified polybutylene terephthalate random copolymer;

wherein the modified polybutylene terephthalate random copolymer has a total monomer content of the ethylene glycol groups, the diethylene glycol groups, and the isophthalic acid groups ranging from 3 and less than or equal to 17 equivalents, relative to the total of 100equivalents of diol groups and 100 equivalents of diacid groups in the modified polybutylene terephthalate random copolymer; and a melting temperature $T_m$ that is at least 200° C.;

wherein the modified polybutylene terephthalate random copolymer, the filler component, and optionally at least one additive, are present in a total combined amount of 100 wt. %; and wherein the composition has a melt flow rate that is higher as compared to a composition that contains polybutylene terephthalate homopolymer consisting of 1,4-butanediol groups and terephthalic acid groups.

2. The composition of claim 1, wherein the modified polybutylene terephthalate random copolymer further comprises a member selected from the group consisting of antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline earth metal salts, alkali salts, phosphorous-containing compounds and anions, sulfur-containing compounds and anions, naphthalene dicarboxylic acid groups, 1,3-propanediol groups, and combinations thereof.

3. The composition of claim 1, wherein the modified polybutylene terephthalate random copolymer further comprises the cis isomer of 1,3-cyclohexanedimethanol, the cis isomer of 1,4-cyclohexanedimethanol, the trans isomer of 1,3-cyclohexanedimethanol, the trans isomer of 1,4-cyclohexanedimethanol and combinations thereof.

4. The composition of claim 1, wherein the modified polybutylene terephthalate random copolymer further comprises a cis isomer of cyclohexanedimethanol, a trans isomer of cyclohexanedimethanol, and combinations thereof.

5. The composition of claim 1, wherein the filler is present in an amount that is at least 1 wt. %, and the filler is selected from the group consisting of glass fillers, ceramic fillers, carbon fillers, metal fillers, mineral fillers, nano-fillers, nano-composites, nano-tubes, talc, and combinations thereof.

6. The composition of claim 1, wherein the fillers are nanotubes and the nanotubes are present in an amount that is 0.0001 to less than 1 wt. %.

7. The composition of claim 1, wherein the modified polybutylene terephthalate random copolymer further comprises cobalt-containing compounds.

8. The composition of claim 1, wherein the composition comprises an additive selected from the group consisting of flame retardants, stabilizers, mold release agents, mixtures of poly(tetrafluoro ethylene) and poly(styrene-co-acrylonitrile), and combinations thereof.

9. The composition of claim 1, wherein the modified polybutylene terephthalate random copolymer is further derived from biomass-based 1,4-butanediol.

10. The composition of claim 1, wherein the composition further comprises a polycarbonate component in an amount ranging from 5 to 90 wt. %.

11. The composition of claim 1, wherein the composition further comprises a flame retardant in an amount ranging from 5 to 30 wt. %.

12. The composition of claim 1, wherein the composition further comprises a carboxy reactive component in an amount ranging from 0.1 to 2 wt. %.

13. The composition of claim 1, wherein the composition further comprises an ultraviolet stabilizer in an amount ranging from 0.05 to 1 wt. %.

14. The composition of claim 1, wherein the composition further comprises a heat stabilizer in an amount ranging from 0.05 to 1 wt. %.

15. The composition of claim 1, wherein the composition further comprises a mold release agent ranging from 0.05 to 1 wt. %.

16. The composition of claim 1, wherein the composition further comprises an impact modifier selected from the group consisting of methacrylate butadiene styrene rubbers, acrylate rubbers, acrylonitrile-styrene-acrylate rubbers, high rubber graft acrylonitrile-butadiene-styrene, silicone-acrylic modifiers, and combinations thereof.

17. The composition of claim 1, wherein the composition imparts to a member selected from the group consisting of the composition, an article molded from the composition and an article extruded from the composition, a heat deflection temperature that is lower as compared to a composition that contains polybutylene terephthalate homopolymer that is derived from monomers not obtained by depolymerization of polyethylene terephthalate copolymers.

18. The composition of claim 1, wherein the composition further comprises an inorganic filler in sufficient amounts to increase the heat deflection temperature of the composition, as compared to the composition without the inorganic filler.

19. The molding composition of claim 1, wherein the composition further comprises a second polyester component that does not contain a modified polybutylene terephthalate derived from polyethylene terephthalate.

20. The composition of claim 1, wherein the composition further comprises a material capable of increasing the heat deflection temperature of the composition by from 1 to 10° C.

21. The composition of claim 20, wherein the material is selected from the group consisting of talcs, nanoparticles, poly(tetrafluoro ethylene), clays, mica, and combinations thereof.

22. The composition of claim 1, wherein the composition has a melt volume rate that is at least 10% higher as compared to a composition made with polybutylene terephthalate homopolymer that is derived from monomers not obtained by depolymerization of polyethylene terephthalate copolymers, as measured on pellets according to ISO 1133 method at 250° C. and 5 kgf at dwelling time of 240 seconds and a 2.1 mm orifice.

23. The composition of claim 22, wherein the melt volume rate is from 10% to 80% higher, as compared to a composition made with polybutylene terephthalate homopolymer that is derived from monomers not obtained by depolymerization of polyethylene terephthalate copolymers, instead of the modified polybutylene terephthalate random copolymers, as measured on pellets according to ISO 1133 method at 250° C. and 5 kgf at dwelling time of 240 seconds and a 2.1 mm orifice.

24. A molding composition comprising:
(a) from 30 to 90 wt. % of a modified polybutylene terephthalate random copolymer that is derived from polyethylene terephthalate copolymers and 1,4-butanediol;
wherein the modified polybutylene terephthalate random copolymer comprises a mixture of 1,4-butanediol groups, ethylene glycol groups, diethylene glycol groups, terephthalic acid groups, and isophthalic acid groups;
(b) a filler component in an amount that is 5 to 70 wt. %;
(c) a flame retardant component in an amount that is 5 to 30 wt. %;
(d) a carboxy reactive component in an amount that is 0.1 to 30 wt. %;
(e) a heat stabilizer in an amount that is 0.01 to 1 wt. %, and
(f) a UV stabilizer in an amount that is 0.05 to 1 wt. %;
wherein the combined amount of (a), (b), (c), (d), (e), (f) and optionally any additional additives, is 100 wt. %;
wherein the ethylene glycol groups and diethylene glycol groups are each present in an amount ranging from 0.1 to 10 mole %, based on 100 mole % of glycol in the modified polybutylene terephthalate random copolymer;
wherein the isophthalic acid groups are present in an amount ranging from 0.1 to 10 mole %, based on 100 mole % of diacid in the modified polybutylene terephthalate random copolymer;
wherein the modified polybutylene terephthalate random copolymer has a total monomer content of the ethylene glycol groups, the diethylene glycol groups, and the isophthalic acid groups ranging from 3 and less than or equal to 17 equivalents, relative to the total of 100 equivalents of diol groups and 100 equivalents of diacid groups in the modified polybutylene terephthalate random copolymer; and a melting temperature $T_m$ that is at least 200° C.; and wherein the composition has a melt flow rate that is higher as compared to a composition that contains polybutylene terephthalate homopolymer consisting of 1,4-butanediol groups and terephthalic acid groups.

25. The composition of claim 24, wherein the composition imparts to a member selected from the group consisting of the composition, an article molded from the composition, and an article extruded from the composition, a heat deflection temperature that is lower as compared to a composition that contains polybutylene terephthalate homopolymer consisting of 1,4-butanediol groups and terephthalic acid groups.

26. The composition of claim 24, wherein the composition further comprises an organic additive in sufficient amounts to increase the heat deflection temperature of the composition, as compared to the composition without the organic additive.

27. The composition of claim 24, wherein the composition has an inherent viscosity that is greater than 0.55 dL/g.

28. The composition of claim 24, wherein the composition further comprises a second polyester component that does not contain a modified polybutylene terephthalate random copolymer.

29. The composition of claim 24, wherein the composition further comprises a carboxy reactive component selected from the group consisting of monofunctional epoxies, multifunctional epoxies, and combinations thereof.

30. A composition comprising:
   (a) from 35 to 50 wt. % of a modified polybutylene terephthalate random copolymer that (1) is derived from polyethylene terephthalate copolymers and 1,4-butanediol, and (2) comprises a mixture of 1,4-butanediol groups, ethylene glycol groups, diethylene glycol groups, terephthalic acid groups, and isophthalic acid groups;
   (b) from 25 and 45 wt. % of a filler component;
   (c) from 0 and 10 wt. % of an impact modifier; and
   (d) from 0 to 5 wt. % of an additive;
   wherein the modified polybutylene terephthalate random copolymer, the filler component, the impact modifier, and the additive are present in a total combined amount of 100 wt. %;
   wherein the ethylene glycol groups and diethylene glycol groups are each present in an amount ranging from 0.1 to 10 mole %, based on 100 mole % of glycol in the modified polybutylene terephthalate random copolymer;
   wherein the isophthalic acid groups are present in an amount ranging from 0.1 to 10 mole %, based on 100 mole % of diacid in the modified polybutylene terephthalate random copolymer;
   wherein the modified polybutylene terephthalate random copolymer has a total monomer content of the ethylene glycol groups, the diethylene glycol groups and optionally isophthalic acid groups ranging from 3 and less than or equal to 17 equivalents, relative to the total of 100 equivalents of diol groups and 100 equivalents of diacid groups in the modified polybutylene terephthalate random copolymer; and a melting temperature $T_m$ that is at least 200° C.;

wherein the composition has a melt flow rate that is higher as compared to a composition that contains polybutylene terephthalate homopolymer consisting of 1,4-butanediol groups and terephthalic acid groups.

31. A method of forming a composition comprising melt blending the components of the composition of claim 1.

32. The method of claim 31, further comprising shaping, extruding, or molding the melt blended composition.

33. The method of claim 31, further comprising molding the melt blended composition.

34. An article comprising the composition of claim 1.

35. A method of forming a composition comprising melt blending the components of the composition of claim 24.

36. The method of claim 35, further comprising shaping, extruding, or molding the melt blended composition.

37. The method of claim 35, further comprising molding the melt blended composition.

38. An article comprising the composition of claim 24.

39. The composition of claim 24,
   wherein the composition has a melt volume rate that is from 10% to 80% higher, as compared to a composition made with monomer derived polybutylene terephthalate homopolymers consisting of 1,4-butanediol groups and terephthalic acid groups, instead of the modified polybutylene terephthalate random copolymers, as measured on pellets according to ISO 1133 method at 250° C. and 5 kgf at dwelling time of 240 seconds and a 2.1 mm orifice.

40. A method of forming a composition comprising melt blending the components of the composition of claim 39.

41. The method of claim 40, further comprising shaping, extruding, or molding the melt blended composition.

42. An article comprising the composition of claim 39.

43. The composition of claim 1, wherein the modified polybutylene terephthalate random copolymer is produced from the polyethylene terephthalate copolymers by a process that results in a reduced $CO_2$ emissions index of 1.3 to 2.5 kg.

44. The composition of claim 1, wherein the modified polybutylene terephthalate random copolymer has a total monomer content of the ethylene glycol groups, diethylene glycol groups, and isophthalic acid groups ranging from 10 and less than or equal to 23 equivalents, relative to the total of 100 equivalents of diol groups and 100 equivalents of diacid groups in the modified polybutylene terephthalate random copolymer.

45. The composition of claim 1, wherein the modified polybutylene terephthalate copolymer has a melting temperature $T_m$ of 203 to 220° C.

46. The composition of claim 1, wherein the modified polybutylene terephthalate copolymer has a melting temperature $T_m$ of 215 to 222° C.

47. The composition of claim 24, wherein the modified polybutylene terephthalate copolymer has a melting temperature $T_m$ of 203 to 220° C.

48. The composition of claim 24, wherein the modified polybutylene terephthalate copolymer has a melting temperature $T_m$ of 215 to 222° C.

* * * * *